(12) United States Patent
Fox et al.

(10) Patent No.: US 7,080,018 B1
(45) Date of Patent: Jul. 18, 2006

(54) METHOD FOR WEATHER-BASED ADVERTISING

(75) Inventors: Frederic D. Fox, Berwyn, PA (US); Douglas R. Pearson, Mounton, PA (US)

(73) Assignee: Planalytics, Inc., Wayne, PA (US)

( * ) Notice: Subject to any disclaimer, the term of this patent is extended or adjusted under 35 U.S.C. 154(b) by 0 days.

(21) Appl. No.: 09/567,503

(22) Filed: May 9, 2000

Related U.S. Application Data

(60) Provisional application No. 60/133,278, filed on May 10, 1999.

(51) Int. Cl.
*G06Q 99/00* (2006.01)

(52) U.S. Cl. .............................. 705/1; 705/14; 705/26; 705/10

(58) Field of Classification Search ................... 705/1, 705/14, 26, 10
See application file for complete search history.

(56) References Cited

U.S. PATENT DOCUMENTS

| | | | |
|---|---|---|---|
| 3,808,410 A | 4/1974 | Schlesinger | 235/156 |
| 4,015,366 A | 4/1977 | Hall, III | 47/1 |
| 4,218,755 A | 8/1980 | Root | 364/900 |
| 4,580,814 A * | 4/1986 | Berler | 283/67 |
| 4,642,775 A | 2/1987 | Cline et al. | |
| 4,766,539 A | 8/1988 | Fox | 364/401 |
| 4,784,150 A | 11/1988 | Voorhies et al. | 128/664 |
| 5,063,506 A | 11/1991 | Brockwell et al. | 364/402 |
| 5,128,861 A | 7/1992 | Kagami et al. | 364/403 |
| 5,128,862 A | 7/1992 | Mueller | 364/405 |
| 5,130,925 A | 7/1992 | Janes et al. | 364/420 |
| 5,140,523 A | 8/1992 | Frankel et al. | 364/420 |
| 5,168,445 A | 12/1992 | Kawashima et al. | 364/403 |
| 5,189,606 A | 2/1993 | Burns et al. | 364/401 |
| 5,208,665 A | 5/1993 | McCalley et al. | 358/86 |
| 5,237,496 A | 8/1993 | Kagami et al. | 364/401 |
| 5,250,941 A | 10/1993 | McGregor et al. | 340/825.65 |
| 5,253,165 A | 10/1993 | Leiseca et al. | 364/407 |
| 5,253,181 A | 10/1993 | Marui et al. | 364/489 |
| 5,283,865 A | 2/1994 | Johnson | 395/161 |
| 5,295,069 A | 3/1994 | Hersey et al. | 364/419.17 |
| 5,309,355 A | 5/1994 | Lockwood | 364/401 |

(Continued)

FOREIGN PATENT DOCUMENTS

JP   4-135271   5/1992

(Continued)

OTHER PUBLICATIONS ("WeatherPlanner Introduces Weather Forecasting Service for Consumers and Small Businesses," PR Newswire, Nov. 11, 1997.*

(Continued)

*Primary Examiner*—John G. Weiss
*Assistant Examiner*—Jonathan Ouellette
(74) *Attorney, Agent, or Firm*—Sterne, Kessler, Goldstein & Fox P.L.L.C.

(57) ABSTRACT

A system and method that allows for weather-based planning of future activities and/or events, and the like. The system includes weather forecast, weather history, activities, advertisement and external information source databases. Also included in the system is a central processing planning server that is accessible via a plurality of internal and external workstations. The workstations provide a graphical user interface for users to enter a series of inputs and receive information (i.e., output) concerning weather-based information. The method involves collecting the series of inputs—geographic location(s), time period(s), and preferred weather pattern(s)—affecting a future event.

12 Claims, 39 Drawing Sheets

U.S. PATENT DOCUMENTS

| | | | | |
|---|---|---|---|---|
| 5,491,629 | A | 2/1996 | Fox et al. | 364/420 |
| 5,521,813 | A | 5/1996 | Fox et al. | 364/401 |
| 5,654,886 | A * | 8/1997 | Zereski et al. | 702/3 |
| 5,712,985 | A | 1/1998 | Lee et al. | 395/207 |
| 5,740,549 | A * | 4/1998 | Reilly et al. | 705/14 |
| 5,796,932 | A | 8/1998 | Fox et al. | 395/161 |
| 5,832,456 | A | 11/1998 | Fox et al. | |
| 5,848,378 | A * | 12/1998 | Shelton et al. | 702/3 |
| 5,855,006 | A | 12/1998 | Huemoeller et al. | 705/9 |
| 5,909,671 | A * | 6/1999 | Byford et al. | 705/26 |
| 5,983,200 | A | 11/1999 | Slotznick | |
| 6,018,640 | A | 1/2000 | Blackman et al. | 399/364 |
| 6,035,285 | A | 3/2000 | Schlect et al. | 705/30 |
| 6,067,525 | A | 5/2000 | Johnson et al. | 705/10 |
| 6,144,944 | A * | 11/2000 | Kurtzman et al. | 705/14 |
| 6,298,307 | B1 * | 10/2001 | Murphy et al. | 702/3 |
| 6,584,447 | B1 | 6/2003 | Fox et al. | |

FOREIGN PATENT DOCUMENTS

| | | |
|---|---|---|
| JP | 9-128411 | 5/1997 |
| JP | 10332840 A * | 12/1998 |

OTHER PUBLICATIONS ("WeatherPlanner Introduces Weather Forecasting Service to Aid Brides in Planning Weddings and Honeymoons," PR Newswire, Dec. 9, 1997.*
("Web WeatherPlanner Site For Weather Predictions," Newsbytes News Network, Dec. 12, 1997.*
("WeatherPlanner Introduces Weather Forecasting Service for Skiers; Revolutionary Planning Tool Provides Forecasts Up to 12 Months in Advance," PR Newswire, Dec. 12, 1997.*
"WeatherPlanner Tees Up Weather Forecasting Service for Golfers; Weather Forecasts Now Available Up to 12 Months in Advance," PR Newswire, Mar. 6, 1998.*
"WeatherPlanner Introduces Weather Forecasting Serivce for Vacationers: Revolutionary Planning Tool Provides Forecasts Up to 12 Months in Advance," PR Newswire, Mar. 19, 1998.*
"WeatherPlanner Offers Weather Forecasting Service for Outdoor Enthusiasts; Weather Forecasts Now Available Up to 12 Months in Advance," PR Newswire, May. 5, 1998.*
www.intellicast.com, Screen Print, Jul. 4, 1998.*
Ojala, Marydee. "The dollar sign: Weather databases online," Database, v18n1, pp. 72-76, Feb./Mar. 1995.*
"Microsoft Expedia Travel Services Debuts on the Web," PR Newswire, Oct. 22, 1996.*
"Skyline Multimedia Entertainment, Inc. Announces Co-Marketing Pact With Internet's InfoSpace.com; Deal Marks Theme Entertainment Company's Expansion into Tour Industry Services." Business Wire, Sep. 4, 1998.*
Hurrell, M., "The Weather Business," Intercity, pp. 29, 31 and 32 (Feb. 1991).
IMREX Demand Forecasting System Product Description, Printed from DIALOG File No. 256, 1 page (1984 -Product Release Date).
Microsoft Excel User's Guide, Microsoft Corporation, pp. 280-281, 596-601 and 706-709 (1992).
Rao, S.R.;Thomas, Edward G; Javalgi, Rajshekhar G., 'Activity Preferences and Trip-Planning Behavior of the U.S. Outbound Pleasure Travel Market', Winter, 1992, Journal of Travel Research, pp. 1-12.
The Weather Initiative, (Brochure), The Met Office, 23 pages (1990).

'Urilicorp's Aquila energy to Greatly Expand it's Weather Hedging Products', Nov. 20, 1997, McGraw-Hill Publications, vol. 17, No. 1, p. 4.
wysiwyg://171/http://www.aquilaenergy.com/northamerica/about/.
English Abstract of Japanese Patent Publication No. 9-128411, 1 page, data supplied from the esp@cenet database.
Best, D.L. and Pryor, S.P., Air Weather Service Model Output Statistics System Project Report, United States Air Force, Entire Report submitted (Oct. 1983).
Demand Modeling & Forecasting System Product Description, Printed from DIALOG File No. 256, 1 page (Aug. 1984) Product Release Date.
Down to Earth Sales Analysis 3.1 Product Description, Printed from DIALOG File No. 256, 1 page (Apr. 1989 -Product Release Date).
Gagne, James, 'Fair-weather trends', May 1997, American Demographics, pp. 1-5.
http://www.bysb.com/sponsors/weathr.htm.
Brennan Peter J., "Portfolio Managers Weather Global Risk Management Challenge," *Wall Street Computer Review*, Dealers Digest Inc., vol. 7, No. 1, pp. 20-22, 24, 54, 56, Oct. 1989.
Jensen, Cary and Anderson, Loy, *Harvard Graphics: The Complete Reference*, Osborne McGraw-Hill, pp. 5, 16, 17, 126-129, 737-747, 1990.
Cave Tom, "Weather Service Is a Boon To System Dispatchers," *Transmission & Distribution*, vol. 43, No. 8, pp. 165, 166, 168-169, Aug. 1991.
Mitchell et al., "Where No Computer Has Gone Before: Massively Parallel Processing Promises Unparalleled Performance," McGraw-Hill Inc., *Business Week*, pp. 80-84, 88, Nov. 25, 1991.
Engle, R.F. et al., "Modelling Peak Electricity Demand," John Wiley & Sons, Ltd., *Journal of Forecasting*, vol. 11, No. 3, pp. 241-251, Apr. 1992.
*Microsoft Access® User's Guide*, Microsoft Corporation, pp. 22-27, 36-39, 327-335, 370-373, 395-447, 1992.
Ehrenberg, A.S.C. et al., "The After Effects of Price-Related Consumer Promotions," Advertising Research Foundation, Inc., *Journal of Advertising Research*, vol 34, No. 4, pp. 11-21, Jul./Aug. 1994.
Patent Abstracts of Japan, JP 1236396, published Sep. 21, 1989.
Patent Abstracts of Japan, JP 1259488, published Oct. 17, 1989.
Patent Abstracts of Japan, JP 2268396, published Nov. 2, 1990.
Patent Abstracts of Japan, JP 2299059, published Dec. 11, 1990.
Patent Abstracts of Japan, JP 4077896, published Mar. 11, 1992.
Patent Abstracts of Japan, JP 4135271, published May 8, 1992.
Patent Abstracts of Japan, JP 4353970, published Dec. 8, 1992.
Patent Abstracts of Japan, JP 5189406, published Jul. 30, 1993.
Patent Abstracts of Japan, JP 6076161, published Mar. 18, 1994.
Patent Abstracts of Japan, JP 6149833, published May 31, 1994.

* cited by examiner

WEATHER HISTORY DATA 210

| YEAR | MA | DATA TYPE | P1 | P2 | P3 | P4 | P5 | P6 |
|---|---|---|---|---|---|---|---|---|
| 1994 | MSA 100 | TEMP. SEA | 46 | 47 | 50 | 51 | 54 | 55 |
| 1995 | MSA 100 | TEMP. SEA | 46 | 47 | 49 | 51 | 53 | 55 |
| 1994 | MSA 100 | SNOW. SEA | 0.7 | 0.2 | 0.2 | 0.1 | 0 | 0.1 |
| 1995 | MSA 100 | SNOW. SEA | 0.8 | 0.2 | 0.2 | 0.1 | 0 | 0 |
| 1994 | MSA 100 | PREC. SEA | 1.01 | 1.03 | 1.08 | 1.1 | 1.12 | 1.1 |
| 1995 | MSA 100 | PREC. SEA | 1.01 | 1.03 | 1.07 | 1.1 | 1.12 | 1.1 |
| 1994 | MSA 100 | SNOW | 0 | 0 | 0 | 0 | 1.2 | 0 |
| 1995 | MSA 100 | SNOW | 0 | 0 | 0 | 0 | 0 | 0 |
| 1994 | MSA 100 | PREC | 1.5 | 0.4 | 0.9 | 1.3 | 1.7 | 0.3 |
| 1995 | MSA 100 | PREC | 1.1 | 0.01 | 2.68 | 1.78 | 0.48 | 0.01 |
| 1994 | MSA 100 | TEMP | 49 | 43 | 45 | 47 | 50 | 42 |
| 1995 | MSA 100 | TEMP | 53 | 51 | 56 | 50 | 58 | 54 |
| 1994 | MSA 100 | TEMP. CAT | -1 | -1 | -1 | -1 | -1 | -1 |
| 1995 | MSA 100 | TEMP. CAT | -1 | -1 | -1 | 0 | -1 | -1 |
| 1994 | MSA 100 | PREC. CAT | -1 | -1 | -1 | -1 | -1 | -1 |
| 1995 | MSA 100 | PREC. CAT | 1 | -1 | -1 | -1 | -1 | -1 |

FIG. 4

| YEAR | MA | DATA TYPE | P1 | P2 | P3 | P4 | P5 | P6 |
|---|---|---|---|---|---|---|---|---|
| N+1 | MSA 100 | SNOW | 0.9 | 0.4 | 0.3 | 0.2 | 0 | 0 |
| N+1 | MSA 100 | PREC | 1.1 | 1.05 | 1.05 | 1.00 | 1.15 | 1.2 |
| N+1 | MSA 100 | TEMP | 48 | 49 | 50 | 53 | 55 | 57 |
| N+1 | MSA 100 | TEMP. CAT | -1 | -1 | -1 | -1 | -1 | -1 |
| N+1 | MSA 100 | PREC. CAT | -1 | -1 | -1 | -1 | -1 | -1 |
| N+1 | MSA 100 | SNOW. CAT | -1 | 0 | 0 | -1 | 0 | 0 |
| N+1 | MSA 100 | SNOW. SEA | 0.8 | 0.4 | 0.3 | 0.1 | 0 | 0 |
| N+1 | MSA 100 | PREC. SEA | 1.00 | 1.03 | 1.06 | 1.05 | 1.10 | 1.1 |
| N+1 | MSA 100 | TEMP. SEA | 47 | 47 | 49 | 52 | 54 | 55 |

215 WEATHER FORECAST DATA

ACTIVITIES DATA 220

| TYPE | GEOGRAPHIC LOCATION | HIGH CONDITIONS | MODERATE CONDITIONS | LOW CONDITIONS |
|---|---|---|---|---|
| POLLEN | MSA 100 | NO PRECIPITATION; TEMPERATURE ABOVE 80 DEGREES | NON SIGNIFICANT RAIN OR SNOW; TEMPERATURE BETWEEN 40 AND 70 DEGREES | SIGNIFICANT RAIN OR SNOW; TEMPERATURE BELOW 30 DEGREES |
| | MSA 101 | NON SIGNIFICANT RAIN; TEMPERATURE ABOVE 75 DEGREES | TEMPERATURE BETWEEN 50 AND 70 DEGREES | NON SIGNIFICANT RAIN OR SNOW; TEMPERATURE BELOW 30 DEGREES |
| | ○ ○ ○ | ○ ○ ○ | ○ ○ ○ | ○ ○ ○ |
| | MSA 556 | NO PRECIPITATION; TEMPERATURE ABOVE 67 DEGREES | NO PRECIPITATION; TEMPERATURE BETWEEN 50 AND 59 DEGREES | NO PRECIPITATION; TEMPERATURE BELOW 45 DEGREES |
| DUST | MSA 100 | NON SIGNIFICANT RAIN; TEMPERATURE ABOVE 80 DEGREES | TEMPERATURE BETWEEN 40 AND 70 DEGREES | SIGNIFICANT RAIN; TEMPERATURE BELOW 30 DEGREES |
| | MSA 101 | NO PRECIPITATION; TEMPERATURE ABOVE 75 DEGREES | TEMPERATURE BETWEEN 50 AND 70 DEGREES | SIGNIFICANT RAIN; TEMPERATURE BELOW 30 DEGREES |
| | ○ ○ ○ | ○ ○ ○ | ○ ○ ○ | ○ ○ ○ |
| | MSA 556 | NO PRECIPITATION; TEMPERATURE ABOVE 67 DEGREES | TEMPERATURE BETWEEN 50 AND 59 DEGREES | NO PRECIPITATION; TEMPERATURE BELOW 45 DEGREES |
| ○ ○ ○ | ○ ○ ○ | ○ ○ ○ | ○ ○ ○ | ○ ○ ○ |

EXTERNAL INFORMATION DATA 230

| GEOGRAPHIC LOCATION | DATE | SCHEDULED EVENT |
|---|---|---|
| MSA 100 | 01/01/99 | PARADE AT 12:00PM |
| | 01/02/99 | ART EXHIBIT (TOWN CENTER) |
| | ○○○ | ○○○ |
| | 12/31/99 | FIREWORKS AT 8:00PM |
| MSA 101 | 01/01/99 | DANCE (COMMUNITY BUILDING AT 9:00PM) |
| | 01/02/99 | ○○○ |
| | 12/31/99 | YEAR END STREET CLEANING – ALL CARS OFF OF PUBLIC STREET BY 7:00AM |
| | | PARADE AT 4:00PM |
| ○○○ | ○○○ | ○○○ |
| MSA 556 | 01/01/99 | FIREWORKS AT 9:00PM |
| | 01/02/99 | LECTURE (HIGH SCHOOL LIBRARY AT 8:00PM) |
| | ○○○ | ○○○ |
| | 12/31/99 | PARADE AT 1:00PM |

FIG. 7

ADVERTISEMENT DATA 225

| GEOGRAPHIC LOCATION | MANUFACTURER | PRODUCT | WEATHER CONDITIONS |
|---|---|---|---|
| MSA 100 | KMART | GLOVES | SIGNIFICANT RAIN OR SNOW; TEMPERATURE BELOW 40 DEGREES |
| | | SUNGLASSES | NO PRECIPITATION |
| | | SUNTAN LOTION | NO PRECIPITATION; TEMPERATURE ABOVE 70 DEGREES |
| | SEARS | UMBRELLA | SIGNIFICANT RAIN OR SNOW |
| MSA 101 | ECKERD DRUGS | SHOVEL | SIGNIFICANT SNOW |
| | | HAIR SPRAY | SIGNIFICANT RAIN OR SNOW |
| | | SUNTAN LOTION | NO PRECIPITATION; TEMPERATURE ABOVE 70 DEGREES |
| | SEARS | UMBRELLA | SIGNIFICANT RAIN OR SNOW |
| | ○ ○ ○ | ○ ○ ○ | ○ ○ ○ |
| ○ ○ ○ | | | |

FIG. 8

ALBANY, NEW YORK
D̖ (WHICH IS A PART OF THE ALBANY, NEW YORK REGION FORECAST AREA)
4/27/98 TO 5/1/98

HIGH TEMPERATURES
- A COUPLE OF COOL DAYS WITH HIGHS IN THE UPPER 50'S TO MID 60'S FROM 4/24/98 THROUGH 4/25/98.
- A SEASONAL DAY OR TWO WITH HIGHS IN THE MID 60'S TO MID 70'S FROM 4/26/98 THROUGH 4/27/98.
- BRIEFLY WARMER WITH HIGHS IN THE UPPER 60'S TO UPPER 70'S FROM 4/28/98 THROUGH 4/29/98.
- COOLER WITH HIGHS IN THE 50'S FROM 4/30/98 THROUGH 5/1/98.

LOW TEMPERATURES
- SEASONAL TO COLD NIGHTS WITH LOWS IN THE LOW 40'S TO LOW 50'S FROM 4/24/98 THROUGH 4/27/98.
- BRIEFLY WARMER WITH LOWS IN THE MID 50'S TO LOW 60'S FROM 4/28/98 THROUGH 4/29/98.
- COOLER WITH LOWS IN THE LOW TO MID 50'S FROM 4/30/98 THROUGH 5/1/98.

PRECIPITATION
- A RELATIVELY DRY PERIOD FROM 4/25/98 THROUGH 4/28/98.
- LIGHT TO MODERATE RAIN FROM 4/29/98 THROUGH 5/1/98.

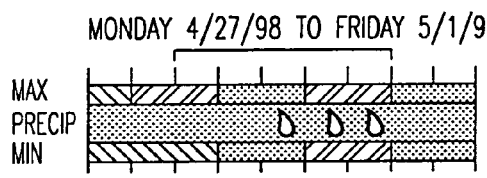

FIG. 17

PHILADELPHIA, PENNSYLVANIA
(WHICH IS A PART OF THE PHILADELPHIA, PENNSYLVANIA REGION FORECAST AREA)
8/26/97 TO 8/29/97

HIGH TEMPERATURES
- BECOMING COOLER WITH HIGHS IN THE MID 60'S TO LOW 70'S FROM 8/23/97 THROUGH 8/26/97.
- A SEASONAL DAY OR TWO WITH HIGHS IN THE LOW TO MID 70'S FROM 8/27/97 THROUGH 8/28/97.
- TURNING MUCH WARMER WITH HIGHS IN THE MID 70'S TO LOW 80'S FROM 8/28/97 THROUGH 9/01/97.

LOW TEMPERATURES
- GENERALLY COOL WITH LOWS IN THE MID 40'S TO LOW 50'S FROM 8/23/97 THROUGH 8/26/97.
- A MOSTLY SEASONAL PERIOD WITH LOWS IN THE 50'S FROM 8/27/97 THROUGH 8/28/97.
- TURNING WARMER WITH LOWS IN THE UPPER 50'S TO LOW 60'S FROM 8/28/97 THROUGH 9/01/97.

PRECIPITATION
- A MOSTLY DRY PERIOD ON OR ABOUT 8/24/97.
- CHANCE OF SHOWERS ON OR ABOUT 8/25/97.
- A MOSTLY DRY PERIOD FROM 8/26/97 THROUGH 8/28/97.
- SLIGHT CHANCE OF THUNDERSTORMS ON OR ABOUT 8/30/97.
- LIGHT TO MODERATE RAINSHOWERS ON OR ABOUT 9/01/97.

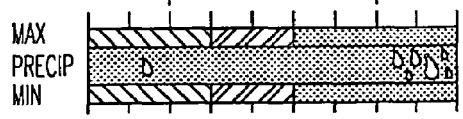

YOUR WEATHER HOROSCOPE

WITH THE INFORMATION BELOW WEATHERPLANNER .COM WILL PROVIDE YOU WITH A COMPREHENSIVE WEATHER HOROSCOPE.

NAME [FIRST NAME] [LAST NAME]

PLACE OF BIRTH [ ]
TYPE THE CITY NAME ONLY. STATE/COUNTRY WILL BE DETERMINED IN THE NEXT STEP.

DATE OF BIRTH [MONTH ⇕] [DAY ⇕] [YEAR]
TYPE IN THE YEAR THAT YOU WERE BORN.

TIME OF BIRTH [HOUR ⇕] [MINUTE ⇕] [AM ⇕]
I DON'T KNOW MY TIME OF BIRTH. ☐

[WEATHER HOROSCOPE] [RESET]

FIG. 29

METHOD FOR WEATHER-BASED ADVERTISING

CROSS-REFERENCE TO OTHER APPLICATIONS

The present application claims priority to the provisional application entitled, "System and Method for Weather-Based Activities Planning and Advertising," invented by Fox et al., Provisional Appl. No. 60/133,278, Filed: May 10, 1999 (incorporated by reference in its entirety).

The following applications of common assignee are related to the present application:

"System and Method for Weather Adapted, Business Performance Forecasting," U.S. application Ser. No. 08/588,248, filed Jan. 18, 1996, now U.S. Pat. No. 5,832,456, incorporated herein by reference in its entirety.

"System, Method and Computer Program Product for Weather Adapted, Consumer Event Planning," U.S. application Ser. No. 09/126,950, filed Jul. 31, 1998, now U.S. Pat. No. 6,584,447, incorporated herein by reference in its entirety.

BACKGROUND OF THE INVENTION

1. Field of the Invention

The present invention relates generally to activities planning and advertising, and more particularly to weather-based activities planning and advertising.

2. Related Art

New technologies are rapidly transforming today's entertainment, communications, advertisement and media industries. We are in fact, witnessing a digital revolution. The Internet is changing the way the world communicates and interacts, the manner by which we relax and enjoy ourselves, the means by which we receive our education and the method by which we purchase our goods and services. It has become the contemporary jet stream.

The pace of technological progress is rapidly accelerating. In the early 1960's, computers were so large they filled entire rooms. Today, microchips smaller than a thumbnail are thousands of times faster than their predecessors. As technology continues to advance at this accelerated pace, the Internet promises to become a major form of media to reach the mass consumer and to attract advertiser support.

The Internet is a decentralized "network" of computers connected by phone lines, cables, satellites and other new technologies. These high-speed links carry a multitude of data, information, files, commands, instructions, discussions, sound and pictures. Less than 25 years old, the Internet began its existence as a governmental effort to protect sensitive files and information in the event of a major catastrophic accident such as war, by connecting U.S. government computers throughout the world and by providing a common language for them to speak. The government then made this network of computers available to universities to exchange data and information. In the early 1990's, it was made available to the public.

Today, the industry that encompasses the Internet is one of the world's fastest growing marketplaces. Its current rate of growth is approximately 50–70% per annum and expanding rapidly. Thousands of new sites are being added weekly. What was once the sole domain of government units and educational institutions is rapidly becoming the daily activity of millions of individual and corporate viewers, users and consumers. Interactive, computer-based services are revolutionizing the way the world enjoys entertainment, receives information, acquires merchandise and communicates with each other. New technologies are simultaneously making the use of the Internet more accessible, secure, productive and enjoyable.

According to Nielsen Media Research, approximately 79 million North Americans 16 years and older are Internet users as of June 1998. That number is forecasted to increase to 88 million users by year-end, resulting in almost 40% of North American population being on-line. This latest survey results indicate that more than 50% of the 16–34 age group (40 million people) are now on-line. In addition, 17% of the 50+age group (13 million people) are Internet users. See, Nielsen Media Research, CommerceNet and Jupiter Communications, 1997–1998, which is incorporated herein by reference in its entirety. It is interesting to note that this demographic segment is growing at the same pace as the overall growth of new Internet users. This segment also accounts for one half of the overall population. By the year 2000, it is estimated that over 130 million consumers will be online. (See, Nielsen Media Research, supra.)

Advancements in technology have also made electronic marketing and purchasing via the Internet a major growth area of the economy. The online world, in fact, is one of America's fastest growing and expanding retail markets. Home shopping via television has already become a three billion-dollar industry; today, the Internet offers the same service, but with an additional advantage of instantaneous selection which offer online consumers the ability to select at will their choice of program and product.

The inventors of the present invention recognized that people today are time constrained, increasingly fragmented and at the mercy of the weather. In general, people need help to make the most out of the limited time they have and to improve the quality of their decision making. In fact, the affects of the weather impacts all aspects of human endeavor. Based on the forecasted weather, a person's planned special event (e.g., golfing, skiing, fishing, boating, vacations, family reunions, weddings, honeymoons, and the like) will be affected. For a special event more than a few days away, people must plan their special events in the "blind" without knowledge of future weather conditions. What is needed is a way of addressing these needs in the field of weather, by bringing weather reporting, forecasting, entertainment and advertising together in this fast emerging electronic world.

SUMMARY OF THE INVENTION

The present invention is a system, method, computer program product, and combinations thereof, that allows for weather-based planning of future activities and/or events (e.g., golfing, vacations, weddings, etc.). The method preferably involves specifying a geographic location and a time period for a future event if the forecasted weather for the event is desired; specifying a time period, a preferred weather pattern and a list of preferred geographic locations for a future event if the best geographic location for the event is desired; or specifying a preferred weather pattern, a time period and a geographic location if the best dates for the event are desired. A weather history database is then accessed to obtain historical weather information about the geographic location during the time period. A weather forecast database is also accessed to obtain future weather information for the geographic location during the time period. If the desired information for the event is not received, the method of the present invention allows for another opportunity to received the desired information.

The system for activities planning of the present invention includes a weather history database that stores historical weather information for at least one geographic location and a weather forecast database that stores future weather information for the geographic location. The system may also include an activities database that stores information manipulated and/or created in some way by the present invention to provide weather-related information. The system also includes an external information source that stores information that the present invention "draws in" from an outside source. In order to access the databases and provide weather-based information, a planning server is included within the system. The planning server provides the central processing of the system by determining relationships between the weather and various activities, and is responsive to a plurality of internal and external workstations that allow users, via a graphical user interface, to access the activities planning system.

An embodiment of the present invention allows a user to redefine weather parameters such that weather-based information provided by the invention is tailored for that user.

Another embodiment of the present invention provides to a user a weather alert for user-defined weather conditions and geographic locations.

Another embodiment of the present invention provides to a user a personalized weather calendar that displays the forecasted weather for a geographic location and also provides the user with the ability to "inhale" or import local or public content for that geographic location to see how the weather and the user's personal calendar will match up.

A further embodiment of the present invention provides a handheld weather planner that has the basic functionality of the invention's method and system for a particular geographic location.

Another embodiment of the present invention provides for weather-based advertising by automatically displaying to a user weather-based advertisements based on the user's activity while using the present invention.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. Generally, the drawing in which an element first appears is indicated by the leftmost digit(s) in the corresponding reference number.

BRIEF DESCRIPTION OF THE FIGURES

The present invention will be described with reference to the accompanying drawings, wherein:

FIG. 4 depicts a preferred weather history database according to an embodiment of the present invention;

FIG. 5 depicts a preferred weather forecast database according to an embodiment of the present invention;

FIG. 6 depicts example data stored in an activities database according to an embodiment of the present invention;

FIG. 7 depicts example data stored in an outside information database according to an embodiment of the present invention;

FIG. 8 depicts example data stored in an advertisement database according to an embodiment of the present invention;

FIGS. 16 and 17 are screen shots depicting output report formats of the Location-for-Event module according to an embodiment of the present invention;

FIGS. 20 and 21 are screen shots depicting output report formats of the Date-for-Event module according to an embodiment of the present invention;

FIG. 25 is a screen shot depicting an output report format of the Weather Calendar module according to an embodiment of the present invention;

FIG. 29 is a screen shot depicting an exemplary graphical user interface input screen for the Weather Horoscope module according to an embodiment of the present invention;

DETAILED DESCRIPTION OF THE PREFERRED EMBODIMENTS

Table of Contents

---

TABLE OF CONTENTS

I. Overview of The Present Invention
II. System Architecture
   A. System Architecture Overview
   B. Weather History Database
   C. Weather Forecast Database
   D. Relationship Between Past and Future Databases
   E. Time Periods
   F. Activities Database
   G. External Information Source
   H. Advertisement Database
III. General System Operation
   A. Definitions
   B. Weather-for-Event Module
   C. Location-for-Event Module
   D. Date-for-Event Module
   E. Weather Pattern Search for Location-for-Event and Date-for-Event
   F. Then-What Module
   G. Weather-Feel Module
   H. Weather Calendar Module
   I. Heads-Up Module
   J. Activities Module
      1. Weather Horoscope Module
      2. Health Module
      3. Sports Module
      4. Finance Module
IV. Weather-Based Advertisement
V. Handheld Weather Planner
VI. Environment

---

I. OVERVIEW OF THE PRESENT INVENTION

Figure 2:
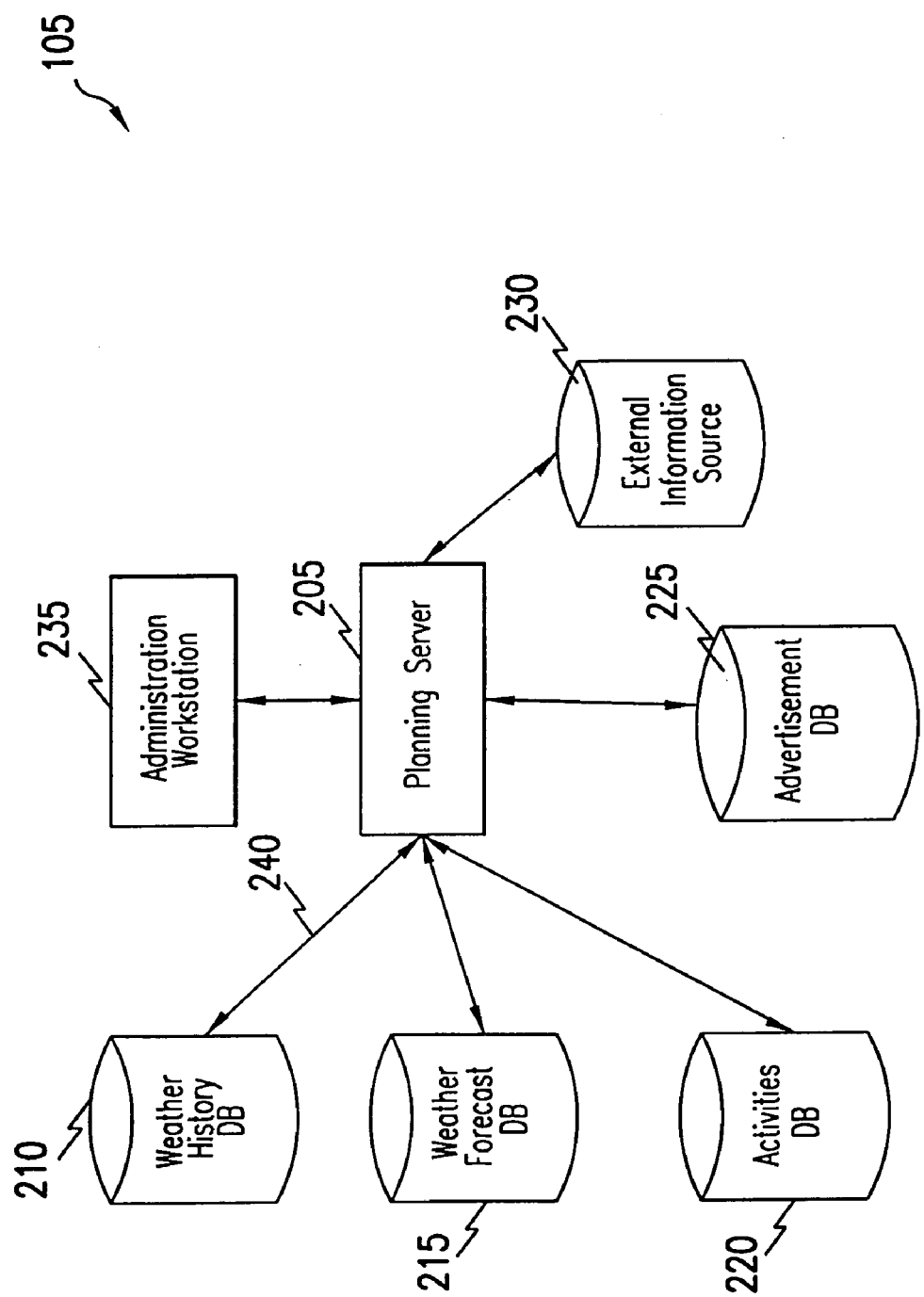
FIG. 2 is a block diagram of the physical components of activities planning system connected by a network according to a preferred embodiment of the present invention.

If a user is planning a special future event such as a family reunion, a wedding or vacation, activities planning system 105 offers a reliable way to assure "nice" weather. Activities planning system 105 may be the basis of an advisory service, providing not just forecasts, but recommendations and advice to help consumers make better planning decisions through detailed, reliable and customized forecasts up to one year in advance. The present invention thus contemplates an activities planning system 105 as shown in FIG. 2 and described in detail below.

II. SYSTEM ARCHITECTURE

A. System Architecture Overview

Figure 1:
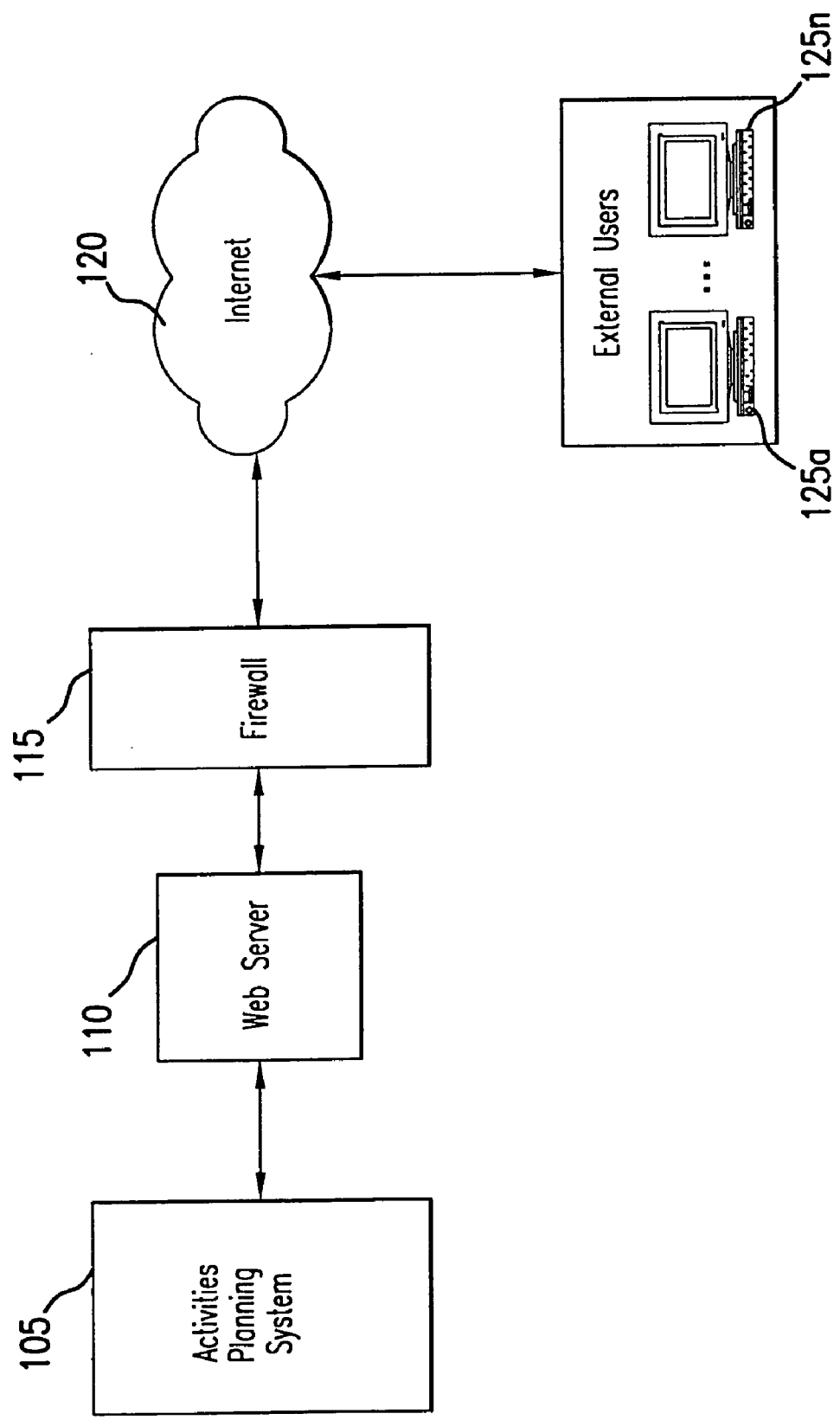
FIG. 1 is a block diagram representing an operating environment according to an embodiment of the present invention.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, an activities planning system 105, a web server 110, a firewall 115, the global Internet 120 and a plurality of external workstations 125 (shown as workstations 125*a*–125*n*) according to an embodiment of the present invention, are shown.

The activities planning system 105 is connected to a Web server 110. As is well-known in the relevant art(s), a Web server is a server process running at a Web site which sends out web pages in response to Hypertext Transfer Protocol (HTTP) requests from remote browsers. The Web server 110 serves as the "front end" of the present invention. That is, the Web server 110 provides the graphical user interface (GUI) to users of the activities planning system 105 in the form of Web pages. An optional firewall 115 serves as the connection and separation between the activities planning system 105 and web server 110 (which includes a plurality of network elements inside of activities planning system 105 connected by a LAN), and the global Internet 120. Generally speaking, a firewall—which is well-known in the relevant art(s)—is a dedicated gateway machine with special security precaution software. It is typically used, for example, to service Internet 120 connections and dial-in lines, and protects a cluster of more loosely administered machines hidden behind it from an external invasion.

The global Internet 103 includes a plurality of external workstations 125 (shown as workstations 125*a*-125*n*). The external workstations 125*a*–125*n* allow users of the Internet to remotely access and use the activities planning system 105.

FIG. 2 is a block diagram of the physical components of activities planning system 105 preferably connected by a network according to a preferred embodiment of the present invention. It should be understood that the particular activities planning system 105 in FIG. 2 is shown for illustrative purposes only and does not limit the invention. Other implementations for performing the functions described herein will be apparent to persons skilled in the relevant art(s) based on the teachings contained herein, and the invention is directed to such other implementations. As will be apparent to one skilled in the relevant art(s), all of components "inside" of the activities planning system 105 are preferably connected and communicate via a communication medium such as a local area network (LAN) 240.

The activities planning system 105 includes a planning server 205 that serves as the "back-end" (i.e., weather processing system) of the present invention. Connected to the planning server 205, is an activities database 220, a weather history database 210, a weather forecast database 215, an advertisement database 225 and an external information source 230.

The activities planning system 105 includes an administrative workstation 235 that may be used by an administrator to update, maintain, monitor, and log statistics related to the planning server 205 and the activities planning system 105 in general.

While one planning server 205 is shown in FIG. 2, it will be apparent to one skilled in the relevant art(s) that activities planning system 105 may be run in a distributed fashion over a plurality of the above-mentioned network elements connected via LAN 240. Similarly, while several databases and one data source (i.e., 210, 215, 220, 225 and 230) are shown in FIG. 2, it will be apparent to one skilled in the relevant art(s) that activities planning system 105 may utilize databases and data sources physically located on one or more computers which may or may not be the same as planning server 102. More detailed descriptions of the activities planning system 105 components, as well as their functionality, are provided below.

B. Weather History Database

An example weather history database 210 is shown in FIG. 4. The weather history database 210 is described in detail in a commonly-owned, U.S. patent application Ser. No. 08/588,248, filed Jan. 18, 1996 entitled, "System and Method for Weather Adapted, Business Performance Forecasting," now U.S. Pat. No. 5,832,456, and incorporated herein by reference in its entirety. For completeness, however, the weather history database 210 is briefly described herein. The weather history database 210 includes, for each year in the view, one or more records for each metropolitan area (MA). (The term MA closely resembles the well known name Metropolitan Statistical Area (MSA). However MA preferably encompasses a larger surrounding geographical area/region than the strict MSA definition. However, the invention is not limited to this embodiment.) (Since MA and MSA are similar, they are used interchangeably herein.) The weather history database 210 contains but is not limited to data on metropolitan areas. These records contain information specifying the weather that occurred in the subject MA in the time span represented in the view. Specifically, for each MA, there is a record for each of several weather data types.

In an embodiment of the present invention, there are three classes of weather data types in the weather history database 108—seasonal, actual, and category (also called weather pattern). A seasonal data type is the seasonal (or average) value of a weather parameter. Accordingly, the data type "temp.sea" is the average temperature. The data type "snow.sea" is the average snowfall. The data type "prec.sea" is the average precipitation.

An actual data type is the actual value of a weather parameter. Accordingly, the data type "temp" is the actual temperature. The data type "snow" is the actual snowfall. The data type "prec" is the actual precipitation.

A category data type reflects a weather parameter's actual versus seasonal values. Accordingly, the data type "temp.cat" reflects actual temperature versus seasonal temperature. The data type "prec.cat" reflects actual precipitation versus seasonal precipitation. If a category data type is equal to 1, then the actual value was greater than the seasonal value. If a category data type is equal to 0, then the actual value was equal to (or substantially corresponded to) the seasonal value. If a category data type is equal to −1, then the actual value was less than the seasonal value. Of course, values other than 1, 0, and −1 could be alternatively used to indicate these relationships. Also, other weather data types may be used.

The historical weather information in the weather history database 210 is provided on a per period basis. As indicated above, the period may be any increment of time, such as daily, weekly, bi-weekly, monthly, bimonthly, quarterly, etc. Preferably, the increment of time represented by a period is the same in both of the weather databases (215 and 108) within activities planning system 105.

Each weather pattern includes one or more weather parameters. For example, the temperature/precipitation weather pattern includes the temperature parameter and the precipitation parameter. For any given period, each parameter can be either seasonal, below seasonal, or above seasonal (except the sustained weather pattern, described above). For any given period, the values of these weather patterns are represented by the entries in the weather history database 210 having the category data type. For example, in 1994, the weather pattern in MSA100 during period P1 was temperature above seasonal/precipitation above seasonal (see records 402 and 404 in FIG. 4). This weather pattern is abbreviated by T1P1. This file is used as the "look up" to allow the system to determine which patterns it will use. Consider, for example, records 402–405 in the weather history database 210 shown in FIG. 4. In period P1, the weather pattern T1P1 occurred in both 1994 and 1995.

C. Weather Forecast Database

An example weather forecast database 215 is shown in FIG. 5. The weather forecast database 215 is described in detail in the commonly-owned, U.S. patent application Ser. No. 08/588,248, filed Jan. 18, 1996 entitled, "System and Method for Weather Adapted, Business Performance Forecasting," now U.S. Pat. No. 5,832,456, and incorporated herein by reference in its entirety. For completeness, however, the weather forecast database 215 is briefly described herein. The weather forecast database 215 includes, for each future year in the view, one or more records for each MA. These records contain information specifying the weather that is predicted to occur in the subject MA in the future time span represented in the view. Specifically, for each MA, there is a record for each of several weather data types.

There are also three classes of weather data types, as in the weather history database 108, are seasonal, actual, and category. These categories are the same as those described above with respect to the weather history database 108. Accordingly, the description above of the weather history database 210 also applies to the weather forecast database 106.

D. Relationship Between Past and Future Databases

As evident by the description above, the weather history database 210 is a past database because it contains historical information. In contrast, the weather forecast database 215 is a future database because it contains information pertaining to predicted weather in the future.

Both databases contain information on a per period basis. Preferably, the increment of time represented by a period is the same in both databases. Also, the periods in both databases are synchronized. Suppose that the increment of time is set equal to one month in an administration setup process using administration workstation 235. In this example, if it is assumed that period P1 represents January, then in weather history database 108, period P1 represents January of a past year. Similarly, in the weather forecast database 106, period P1 will represent January of a future year.

E. Time Periods

As discussed above, data may be stored in the weather history database 210 using any time increment or period, including but not limited to daily, weekly, monthly, quarterly, etc. Similarly, weather forecast information for each location may be stored in the weather forecast database 215 on a daily basis, a weekly basis, a monthly basis, or a quarterly basis. Preferably, the time increment/period is the same in both databases 210 and 106. In practice, a system administrator will select the time increment(s)/period(s) during an administrator setup process using administration workstation 235 in order to meet the demands of Internet users using the plurality of workstations 125a–125n.

F. Activities Database

The activities database 220 of activities planning system 105 contains information manipulated and/or created by the present invention in some way to provide weather-related information to the user. This information is typically related to activities affected (e.g., actually affected, potentially affected, perceived as being affected, etc.) by the weather including most sports, gardening, vacations, outdoor events (such as weddings and concerts), business traveling, health, finances, sex, horoscope, etc. This activities data is used by the planning server 102. The activities database 220 includes information relevant to how the weather may affect each activity. Such information, as will be apparent to one skilled in the relevant art(s), may include but is not limited to the type of weather a scheduled outdoor or sporting event is likely to experience, the likeliness of arthritis or allergies in certain geographic areas flaring up due to the weather, the likeliness of the increase or decrease in sexual drives due to the weather, and the like.

Activities database 220 contains many different types of records, each type of record relating to one of the different weather related activities. For example, one weather related activity is how weather affects allergies. An example allergy index record in the activities database 220 is shown in FIG. 6. The allergy index record includes, for each type of allergy of interest, one record for each MA. Each record contains information for that particular type of allergy and MA specifying the type of weather that will result in High, Moderate and Low allergy conditions. Information in the allergy index record (from the activities database 104) is then compared to information in the weather forecast database 215 to present to the user how weather is predicted to affect different types of allergies for different MA. It should be understood that the types of data shown in FIG. 6 are for example purposes only and that other types of data can also be included, namely suggestions to reduce the affects of a particular allergy, etc.

G. External Information Source

Figure 3:
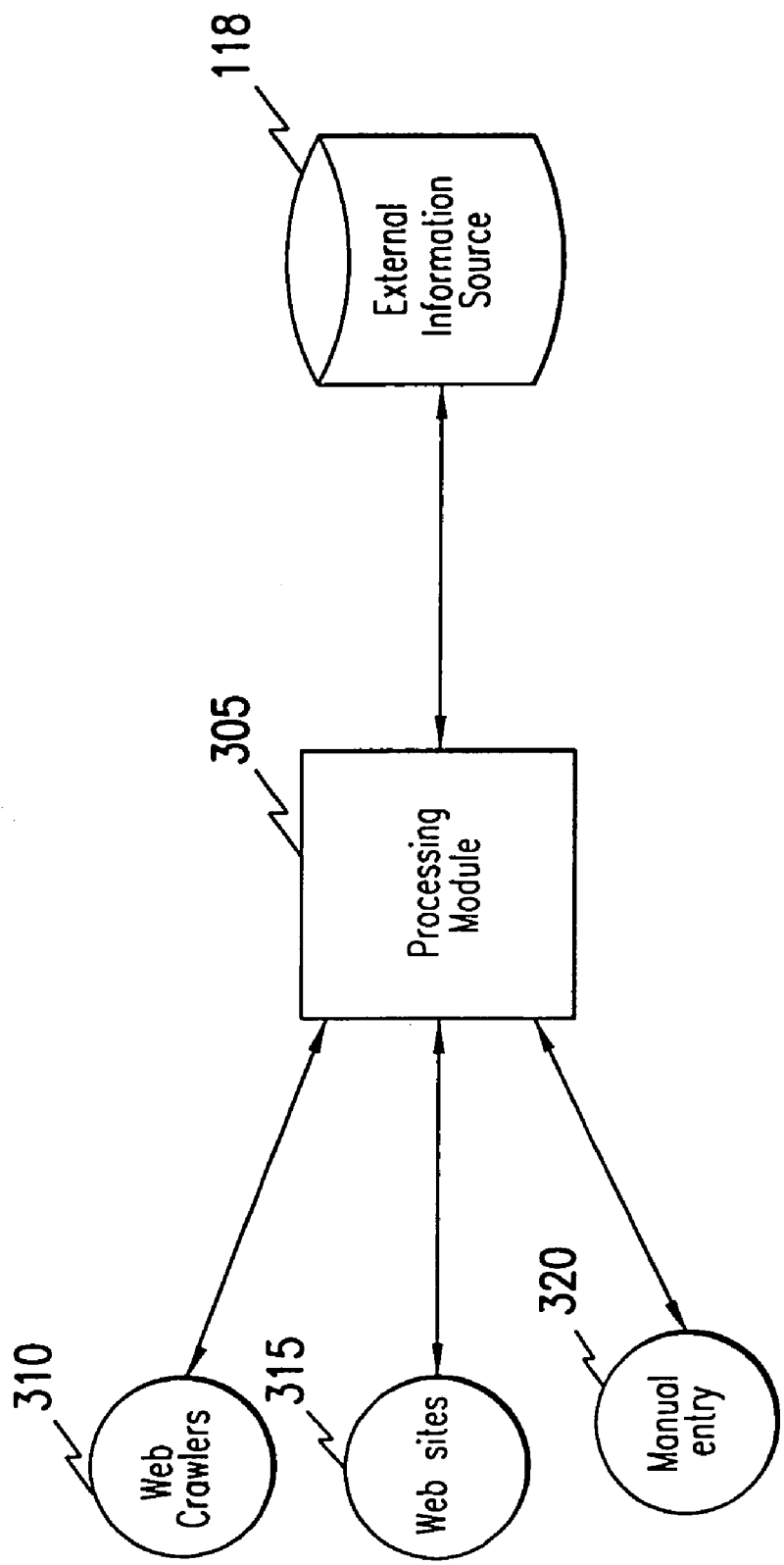
FIG. 3 is a block diagram representing various methods of obtaining information stored in an outside information database according to an embodiment of the present invention.

The external information source 230 of activities planning system 105 contains information that the present invention "draws in" from an outside source in a variety of different ways. Unlike the data in activities database 104, the present invention does not manipulate and/or create this data in external information source 230, although the invention may process the information once it is received. FIG. 3 is a block diagram representing various ways of obtaining data for external information source 230. It should be understood that FIG. 3 is shown for illustrative purposes only and does not limit the invention. FIG. 3 shows the collection of data via web crawlers 310, direct connections to web sites 315 and manual entry 320. These entities represent sources of data, collectors of data, and means for inputting/receiving data. These collections of data are then sent to processing module 305 to reformat the data for use by external information source 230, and for processing by the invention.

As is well-known in the relevant art(s), a web crawler is a program that indexes any web site it is pointed at that is open to the public. In a sense, it "crawls" through all the web pages (of the web site) and creates an index of their content. Manual entry 320 may involve contracting an agency to input data from a newspaper (or any other publication), from publicly broadcasted programs, from independent researched, etc. A specific example of the type of data utilized by the present invention that may involve manual entry 320 is a collection of public events for each MA. As will be described later in detail, a user is given the opportunity to "draw in" public events into a personalized weather calendar. An example of this type of data after it has been processed by processing module 305 is shown in FIG. 7.

FIG. 7 shows a public event record which includes, for each MA, information about public events that are scheduled for future dates. The information includes the geographic location (i.e., MSA), date and scheduled event. Data associated with external information source 230 may or may not be related to the weather. It should be understood that the types of data shown in FIG. 7 are for example purposes only and that other types of data can also be included, namely the cost of attending the event, the type of weather that may result in the cancellation of the particular event, etc.

H. Advertisement Database

The advertisement database 225 of activities planning system 105 contains product advertisements that become more or less desirable to a consumer depending on the weather. Weather-based advertisements pop up on the screen while a user is using activities planning system 105. The advertisements are preferably weather and content based. For example, say a user desires to take a Florida trip the second week of December and uses activities planning system 105 to find out that the weather at that time is going to be rain. An advertisement for umbrellas at a local store may prompt the user to purchase an umbrella for his Florida trip prior to leaving. Alternatively, an advertisement for umbrellas at a Florida store close to the user's destination may prompt the user to purchase an umbrella at that store while on his trip.

Advertisement database 225 contains a type of record relating to different products that are more desirable for a certain type of weather. An example advertisement record in the advertisement database 225 is shown in FIG. 8. The record includes, for each MA, advertisements for products that are desirable for specific weather conditions. It should be understood that the types of data shown in FIG. 8 are for example purposes only and that other types of data can also be included, namely coupons to be displayed with the advertisement, a priority scheme for which advertisements get displayed first, second, and so forth, etc.

The advertisement database 225 of activities planning system 105 may also display products based on a combination of the weather and the particular activity or event the user is planning. For example, activities planning system 105 may prompt the user for the desired activity. Assume the user entered "outdoor wedding" for his activity. If the activities planning system 105 determines that the weather will be rain, the advertisement displayed may be for a big tent. Another example is if the user entered "vacation" for his activity and the activities planning system 105 determines rain, then the advertisement displayed may be for tickets to a play.

III. GENERAL SYSTEM OPERATION

Figure 9:
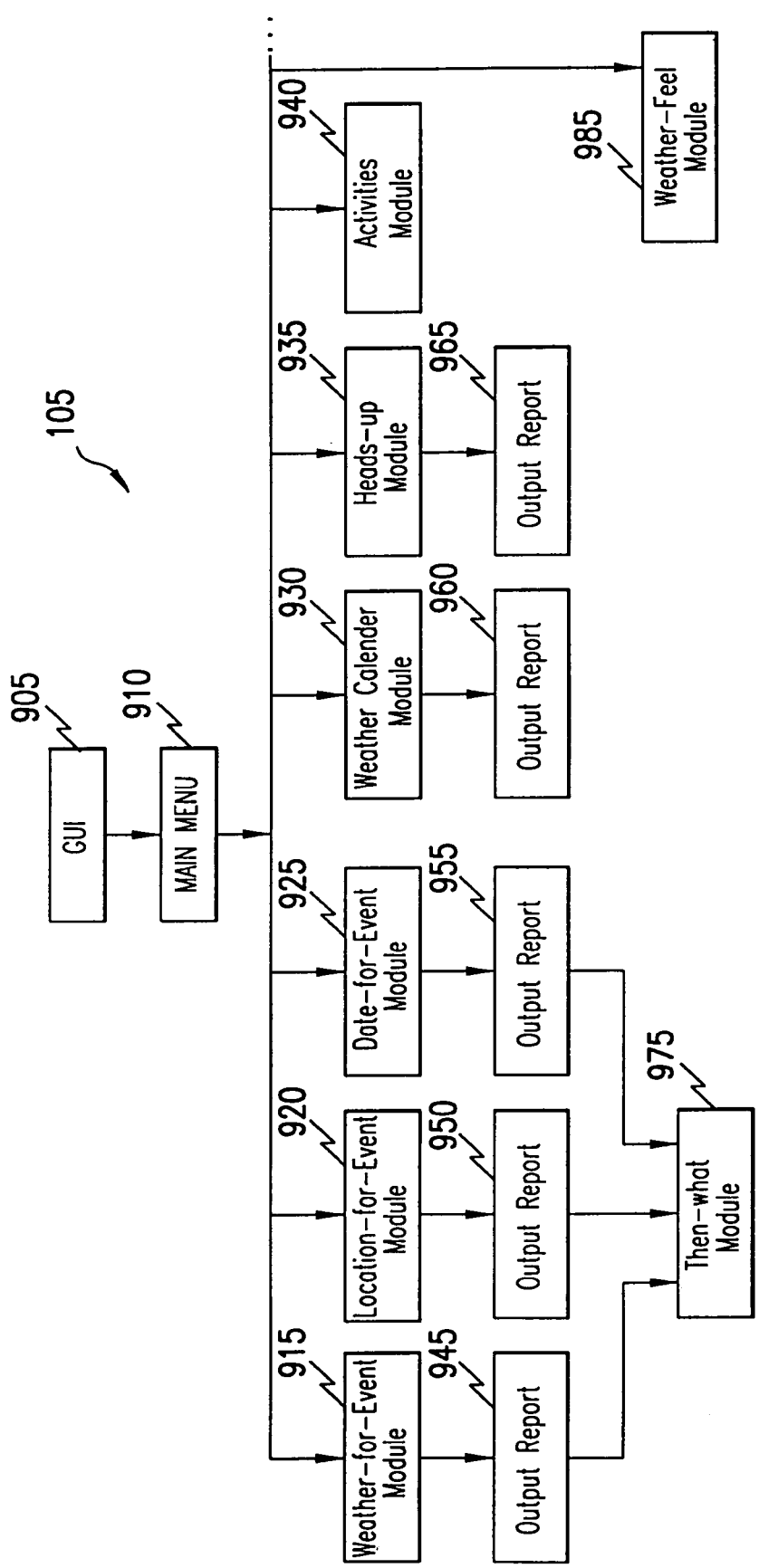
FIG. 9 depicts the manner in which users may navigate through functions and services provided by the activities planning system according to an embodiment of the present invention.

Referring to FIG. 9, the manner in which users may navigate through functions and services provided by the activities planning system 105 according to an embodiment of the invention is shown. The activities planning system 105 provides a GUI 401 so that it may be accessible and customizable by a user directly on a desktop computer, via a World Wide Web page over the Internet (i.e., through on-line services), or accessible via an Intranet. In an alternative embodiment, it maybe accessible via telephone services or the like. It should be understood that the control flows shown in FIG. 9 are presented for example purposes only. The GUI 401 of the present invention is sufficiently flexible and configurable such that users may navigate through the activities planning system 105 in ways other than that shown in FIG. 9.

In a preferred embodiment, activities planning system 105 provides eight modules: a Weather-for-Event module 915; a Location-for-Event module 920; a Date-for-Event module 925; a Weather Calendar module 930; a Heads-Up module 935; an Activities module 940; a Then-What module 975; and a Weather-Feel module 985. These eight modules, accessible via a main menu 910 linked to the GUI 905, are first described briefly below and then in detail with reference to FIGS. 10, 14, 18, 24, 26, 27, 22 and 23, respectively. These modules are described for illustrative purposes. The invention is not limited to these modules.

Embodiments of Weather-for-Event module 915, Location-for-Event module 920 and Date-for-Event module 925 are described in detail in the commonly-owned U.S. patent application Ser. No. 09/126,950, filed Jul. 31, 1998 entitled, "System, Method and Computer Program Product for Weather Adapted, Consumer Event Planning," incorporated herein by reference in its entirety. For completeness, however, the three features are briefly described herein.

Weather-for-Event module 915 may be used by a user, if he is sure of where he will be and when he will be there, to find the weather for an event. Activities planning system 105 causes a complete report 945 to be outputted, which includes graphics on the conditions the user may expect for the future event.

Location-for-Event module 920 may be used by a user, if he knows when he wants to go (i.e., the time period) and the kind of weather he wants. In a preferred embodiment, activities planning system 105 lets the user choose three locations and then causes a report 950 to be outputted with text and custom graphics reporting which one of the three inputted locations will have the kind of weather the user desires. Date-for-Event module 925 may be used by a user, if he is sure of where he is going to be and what kind of weather he desires. Activities planning system 105 causes a report 955 to be outputted to the user that will assist in determining the best time for the future event.

Then-What module 975 may be used by a user, if the user is not satisfied with the results of either Weather-for-Event module 915, Location-for-Event module 920 or Date-for-Event module 925. Activities planning system 105 causes a report to be outputted to the user that will assist in determining the desired information. The report can be report 945, report 950 or report 955, dependant on which module (915–925) the user executes. The Then-What module 975 is also applicable to other modules.

Weather Calendar module 930 may be used by a user to display a local calendar of forecasted weather for any North American location. This includes forecasts for a rolling number of days, and the ability to "inhale" and display local or public content for any city, or to display data already in the database. Activities planning system 105 causes a report 960 to be outputted to the user that will show how the weather and the user's personal calendar will match up, and then take appropriate action.

Heads-Up module 935 may be used by a user to receive weather alerts for user-defined weather conditions and geographic locations. Activities planning system 105 causes a report 965 to be outputted to the user in the form of an e-mail message or a warning displayed on the user's personalized weather calendar.

Activities module 940 may be used by a user to receive information about a variety of activities that are potentially or actually affected by the weather. Such activities include sports, horoscope, health, finance, etc. Activities planning system 105 causes a report to be outputted to the user where the report is modified to reflect the type of activity desired by the user (as will be described in reference to FIG. 27 below).

Weather-Feel module 985 may be used by a user to redefine weather parameters (used by the other modules) such that the weather forecast provided by the present invention is tailored for each user. For example, seasonal (as defined below) refers to the type of weather that is about normal or routine for the time of the year. The problem is that for a person living in Philadelphia, Pa, seasonal for Jun. 6–10, 1999 is a daytime high of 75 degrees. Seasonal in Palm Beach, Fla. for the same time is a daytime high of 100 degrees or more. Thus, for the person living in Philadelphia, a daytime high of 100 degrees is warm and not seasonal. Therefore, the Weather-Feel module 985 allows the user to redefine weather parameters to define his own idea of what is seasonal, warm and cold.

A. DEFINITIONS

Before further describing the eight modules of the activities planning system 105, the following terms used herein below (especially within the GUI 905) are first defined. These definitions are provided for illustrative purposes, to aid the reader in understanding the invention. The definitions are not intended to be all-inclusive.

Cold—The term most often used during the months from late fall to early spring (depending on the geographic location) to describe a period with temperatures that are below the seasonal (normal) range.

Precipitation—Any or all forms of water particles, whether liquid or solid, that fall from the atmosphere. The term includes such forms as drizzle, rain, showers, snowfall, snow pellets or grains, ice crystals, and hail.

Seasonable—In keeping with, or appropriate to, the time or season; timely; about normal or routine for the time of the year. Typical weather elements (temperature, precipitation, etc.) for a given location at a specific time (daily, weekly, monthly, yearly, etc.).

Warm—Temperatures that are above the seasonal (normal) range for a given location at a specific period of time.

B. Weather-for-Event Module

Figure 10:
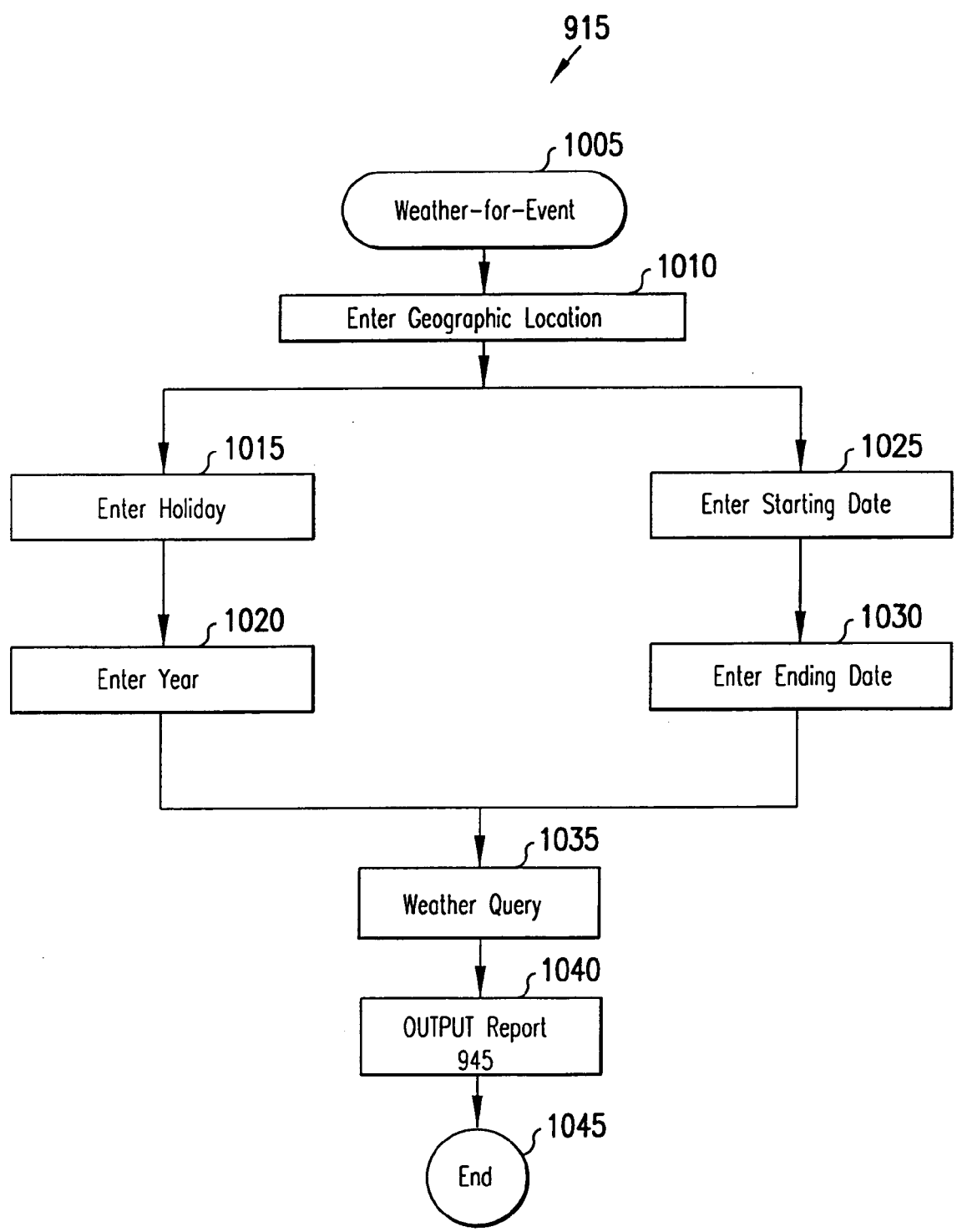
FIG. 10 is a flowchart illustrating the detailed operation of a Weather-for-Event module according to an embodiment of the present invention.
Figure 11:
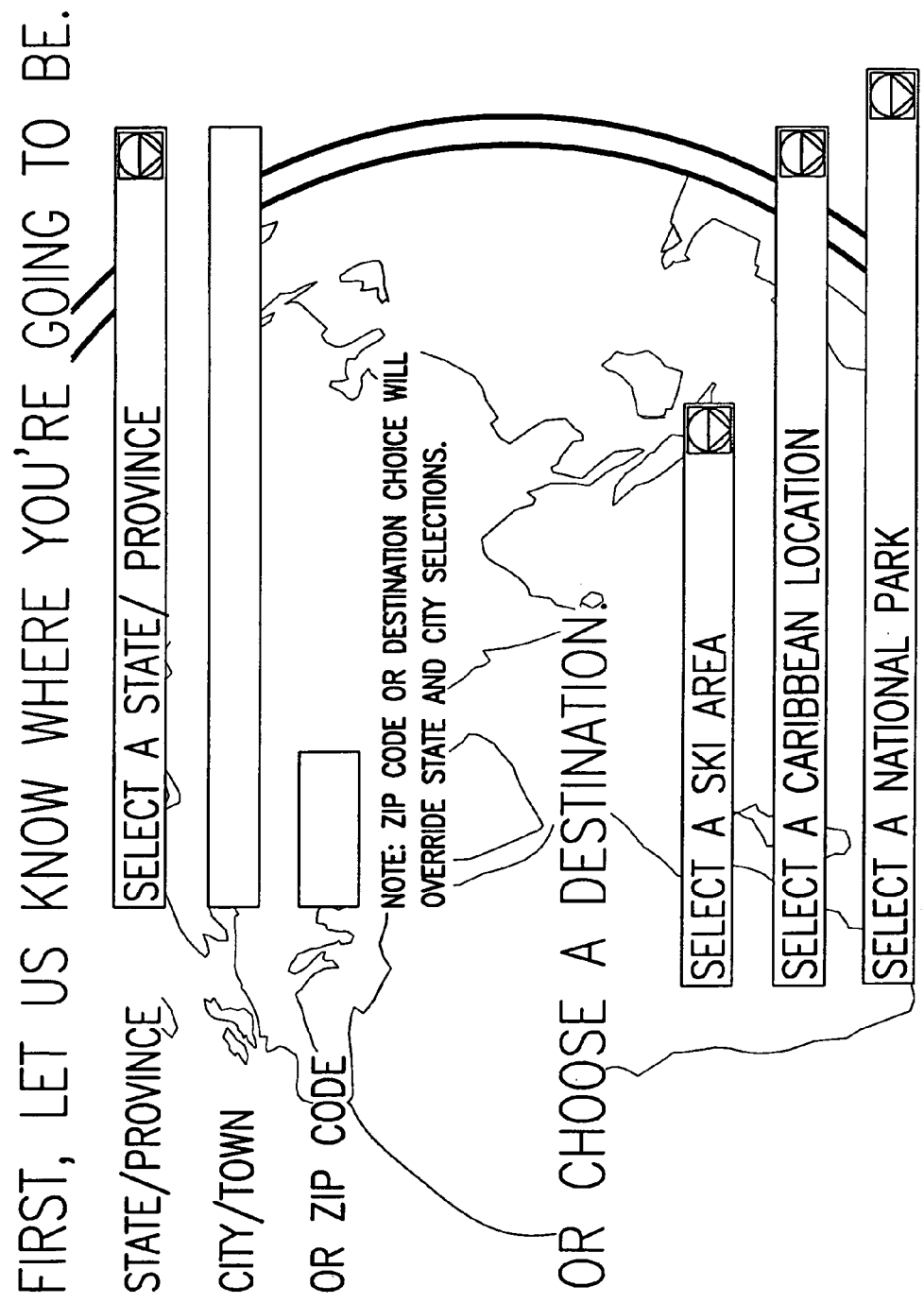
FIGS. 11 and 12 are screen shots depicting exemplary graphical user interface input screens for the activities planning system according to an embodiment of the present invention.

Weather-for-Event module 915 may be used by a user, if he is sure of where he will be and when he will be there, to find the weather for an event. Activities planning system 105 causes a complete report 945 to be outputted, which includes graphics on the conditions the user may expect for the future event. Referring to FIG. 10, a flowchart illustrating the detailed operation of the Weather-for-Event module 915 is shown. Weather-for-Event module 915, after being selected via the main menu 910, begins at step 1005 with control passing immediately to step 1010. In step 1010, the user is prompted to enter a geographic location. The geographic location may be identified as a state or province, a city or town or by zip code, or any combination thereof. The zip code will override any entered state or city selections. In alternate embodiments, the geographic location may also be specified, for example, from a list of known ski resorts, Carribean resorts, national parks, and the like. An exemplary GUI screen for allowing the user to enter the desired geographic location is shown in FIG. 11.

Figure 12:
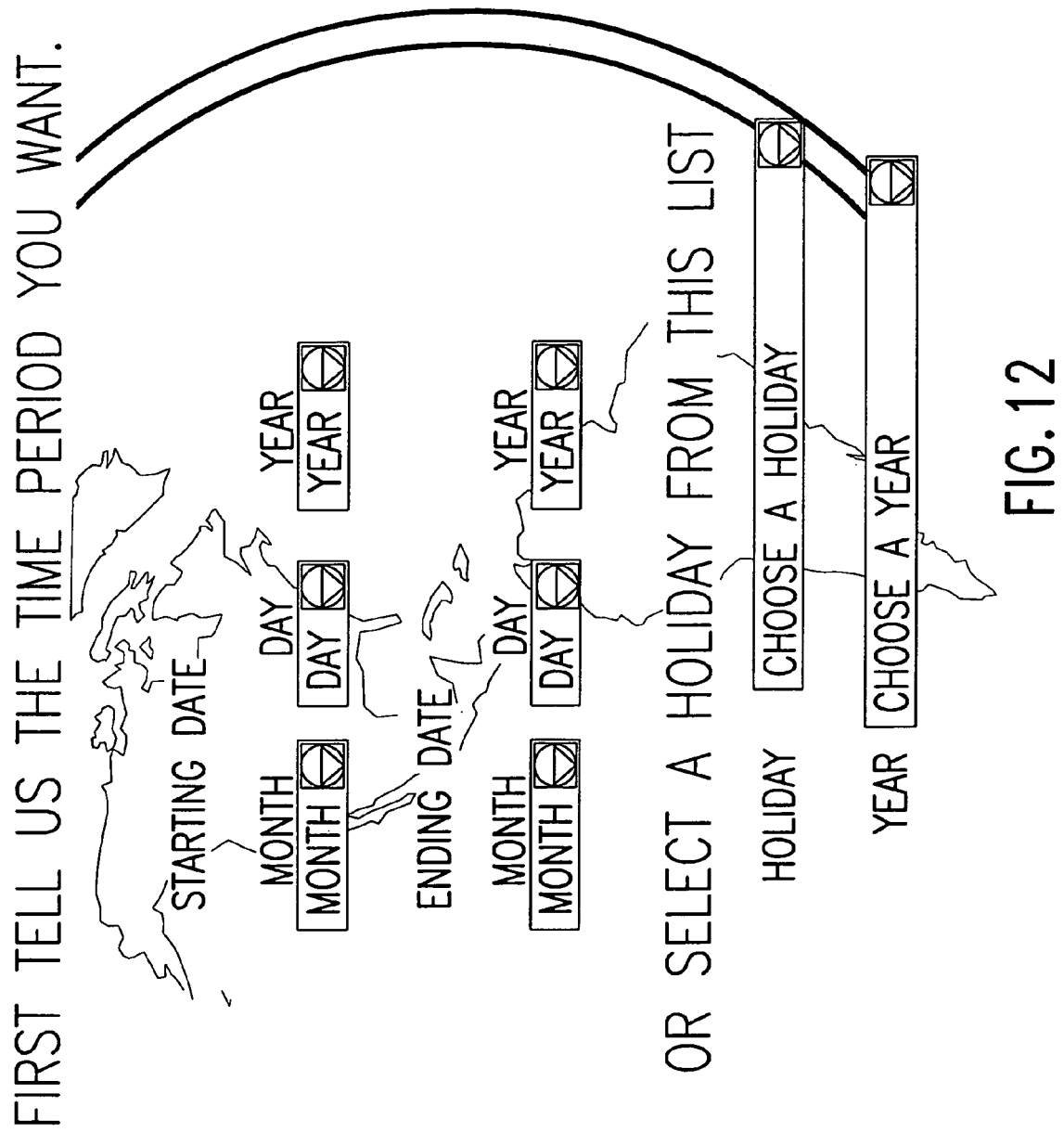

After entering the geographic location, the user is presented with a choice of how to enter the specified dates for the event (i.e., the time period). The first option is to enter a holiday (step 1015) and then enter a year for the holiday (step 1020). In a preferred embodiment, Weather-for-Event module 915 will eventually generate a weather report for the holiday, but anticipates a possible greater/lesser than three days on either side of the holiday. Alternately, instead of entering a holiday and a year, the user may enter a specific starting date (step 1025) and then a specific ending date (step 1030). The starting date and ending date are specified in the conventional terms of month, day and year. An exemplary GUI screen for allowing the user to enter the desired time period, via either option, is shown in FIG. 12.

Activities planning system 105 then proceeds to step 1035. In step 1035, a weather query is performed as described in detail in the commonly-owned U.S. patent application Ser. No. 09/126,950, filed Jul. 31, 1998 entitled, "System, Method and Computer Program Product for Weather Adapted, Consumer Event Planning," incorporated herein by reference in its entirety. Using the inputs entered by the user (i.e, steps 1010–1030), the weather query searches for the forecasted weather for the specified location and time period within weather forecast database 215, as also described above. In step 1040, an output report 945 is generated. Weather-for-Event module 915 is thus completed as indicated by step 1045.

Figure 13:
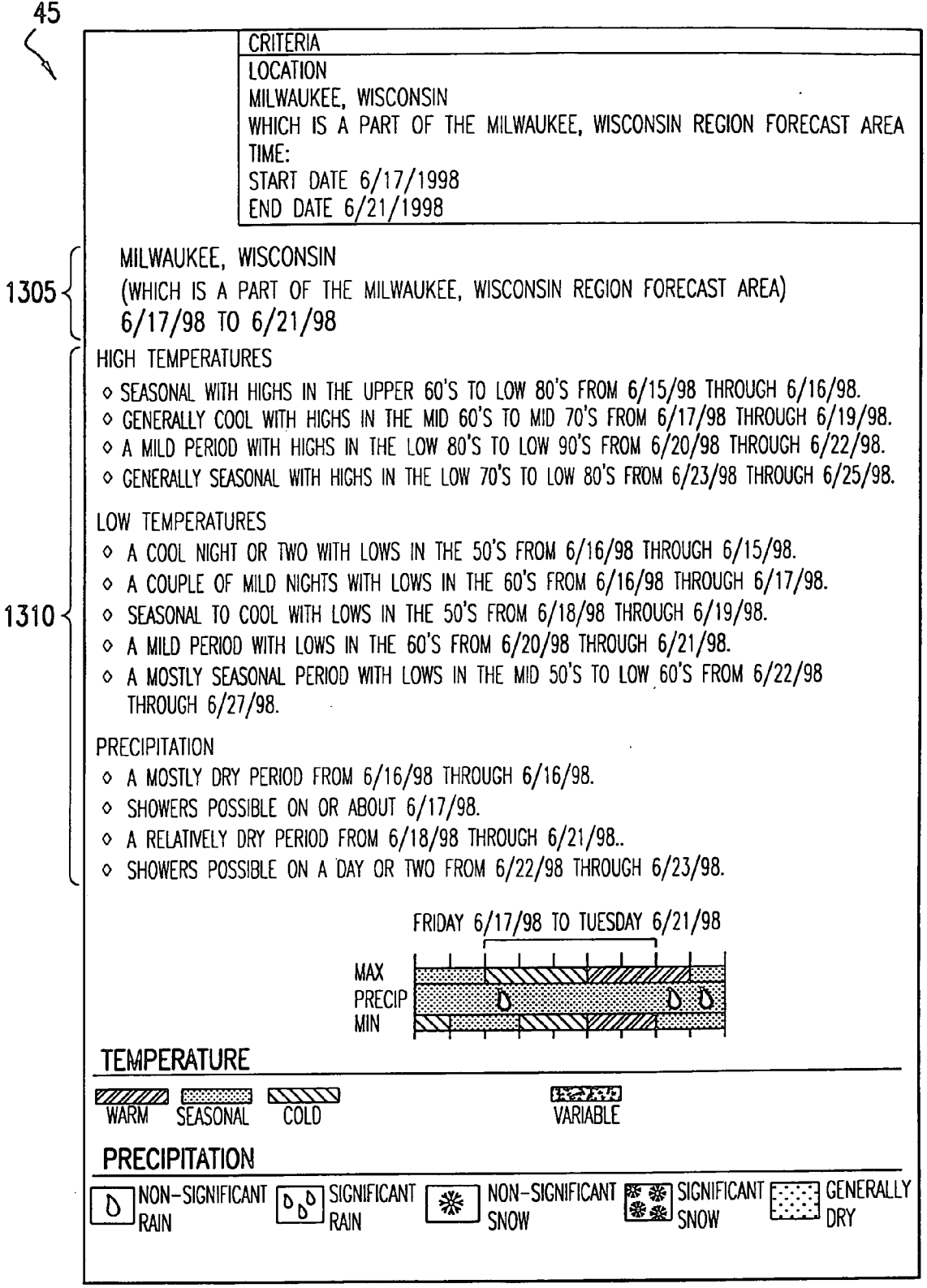
FIG. 13 is a screen shot depicting an output report format of the Weather-for-Event module according to an embodiment of the present invention.

Referring to FIG. 13, an exemplary output report 945 for the Weather-for-Event module 915 is shown. The criteria entered from steps 1010–1030 are summarized on a first portion 1305 of a first page of the report 945. Report 945 also includes a detailed weather plan for the time period and geographic location (second portion 1310) according to results of the weather query.

It should be understood that the report 945 shown in FIG. 13, as well as reports 950 and 955 described below, are presented for example purposes only. The GUI 905 of the present invention is sufficiently flexible and configurable such that users may receive reports in other formats including graphs, charts, and the like.

C. Location-for-Event Module

Figure 14:
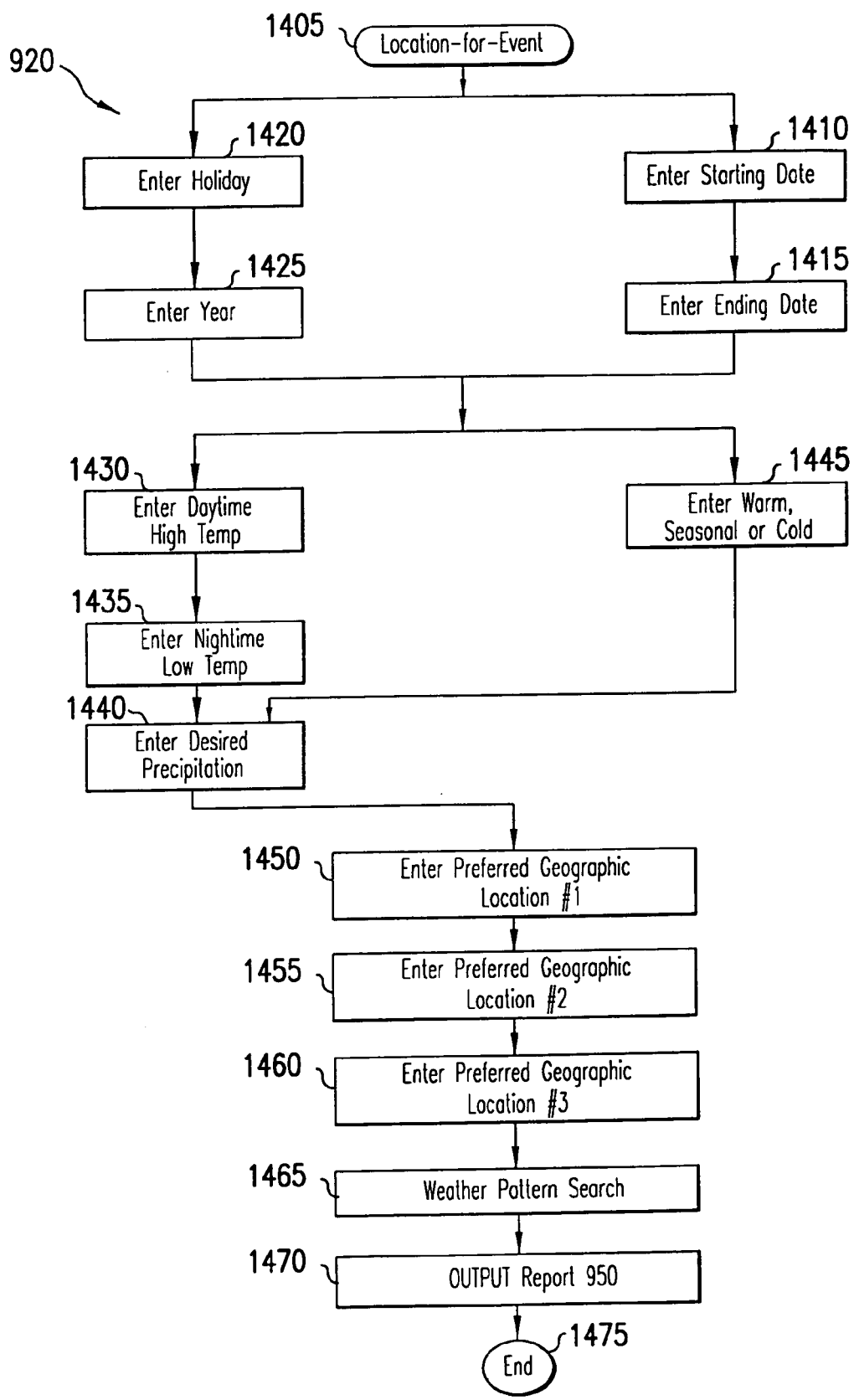
FIG. 14 is a flowchart illustrating the detailed operation of a Location-for-Event module according to an embodiment of the present invention.

Location-for-Event module 920 may be used by a user, if he knows when he wants to go (i.e., the time period) and the kind of weather he wants. In a preferred embodiment, activities planning system 105 lets the user choose three locations and then causes a report 950 to be outputted with text and custom graphics reporting which one of the three inputted locations will have the kind of weather the user desires. Referring to FIG. 14, a flowchart illustrating the detailed operation of the Location-for-Event module 920 is shown. Location-for-Event module 920, after being selected via the main menu 910, begins at step 1405 with control passing immediately to step 1410 or to step 1420. In steps 1410–1425, the user is presented with a choice of how to specify the time period for his event. The user may enter a starting date and an ending date in steps 1410 and 1415, respectively. An alternate option is for the user to enter a holiday and a year of the holiday in steps 1420 and 1425, respectively. The exemplary GUI screen for allowing the user to enter the desired time period, as shown in FIG. 12 and described above, may also be used in the Location-for-Event module 920.

Figure 15:
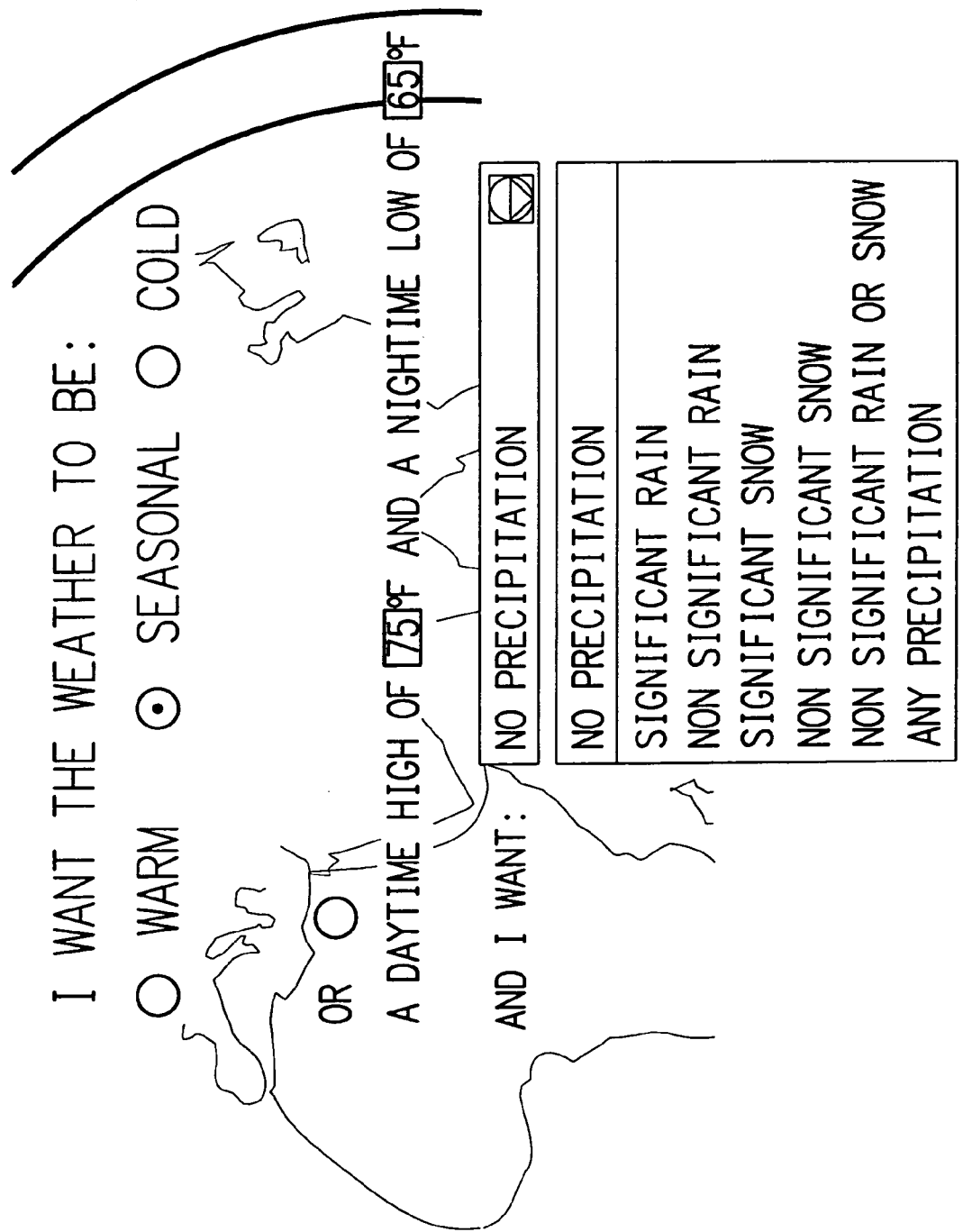
FIG. 15 is a screen shot depicting exemplary graphical user interface input screen for the activities planning system according to an embodiment of the present invention.

After using one of the alternate methods to specify the time period for the event, the user then again has a choice of how to enter the specific weather they desire for their event. In step 1445, the user may simply enter warm, seasonable or cold to specify the type of weather desired. Alternately, in steps 1430 and 1435, the user may enter a daytime high temperature and a nighttime low temperature, respectively. An exemplary GUI screen for allowing the user to enter the desired weather, via either option, is shown in FIG. 15.

In step 1440, the user is prompted to select the desired precipitation level. The level may be significant rain, non-significant rain, significant snow, non-significant snow, non-significant rain or snow, or any precipitation. Other ways to enter weather criteria can also be used, such as the techniques discussed elsewhere herein. Location-for-Event module 920 then proceeds to step 1450. In step 1450, the user enters his first choice for a preferred geographic location. The entering of the preferred geographic location is similar to that described with reference to FIG. 11 (step 1010) above. In step 1455, the user enters his second choice for a preferred geographic location and, in step 1460, the user enters his third choice for a preferred geographic location. The exemplary GUI screen for allowing the user to enter the desired geographic location, as shown in FIG. 11, may also be used (i.e., three iterations) for the Location-for-Event module 920.

Figure 16:
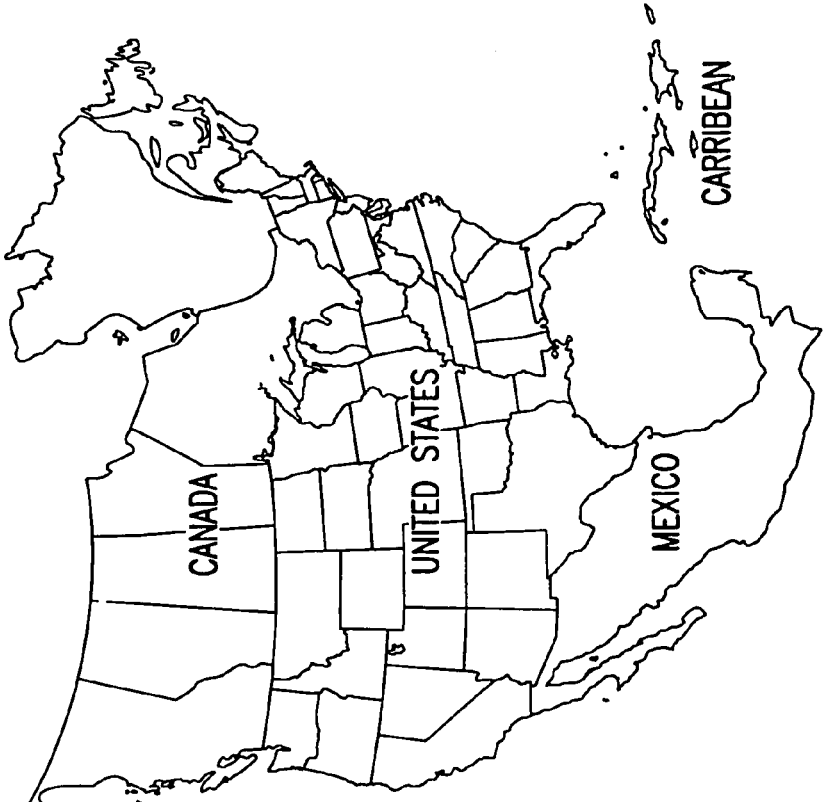

Location-for-Event module 920 then proceeds to step 1465, where a weather pattern search is performed using the future data within a weather patterns database, as described in detail in the commonly-owned U.S. patent application Ser. No. 09/126,1950, filed Jul. 31, 1998 entitled, "System, Method and Computer Program Product for Weather Adapted, Consumer Event Planning," incorporated herein by reference in its entirety. After the weather pattern search is performed, an output report 950 is generated. Output report 950 is shown in FIGS. 16 and 17. Location for event 920 then ends as indicated by step 1475.

Referring to FIGS. 16 and 17, an exemplary output report 950 for the Location-for-Event module 920 is shown. In FIG. 16, the criteria entered from steps 1410–1460 are summarized on a first page of the report 950. In FIG. 17, a detailed weather plan is given on a second page of the report 950 for the location which ranks first according to results of the weather pattern search. It should also be noted that the output report 950 may return an empty calendar if no location matches the criteria selected by the user.

D. Date-for-Event Module

Figure 18:
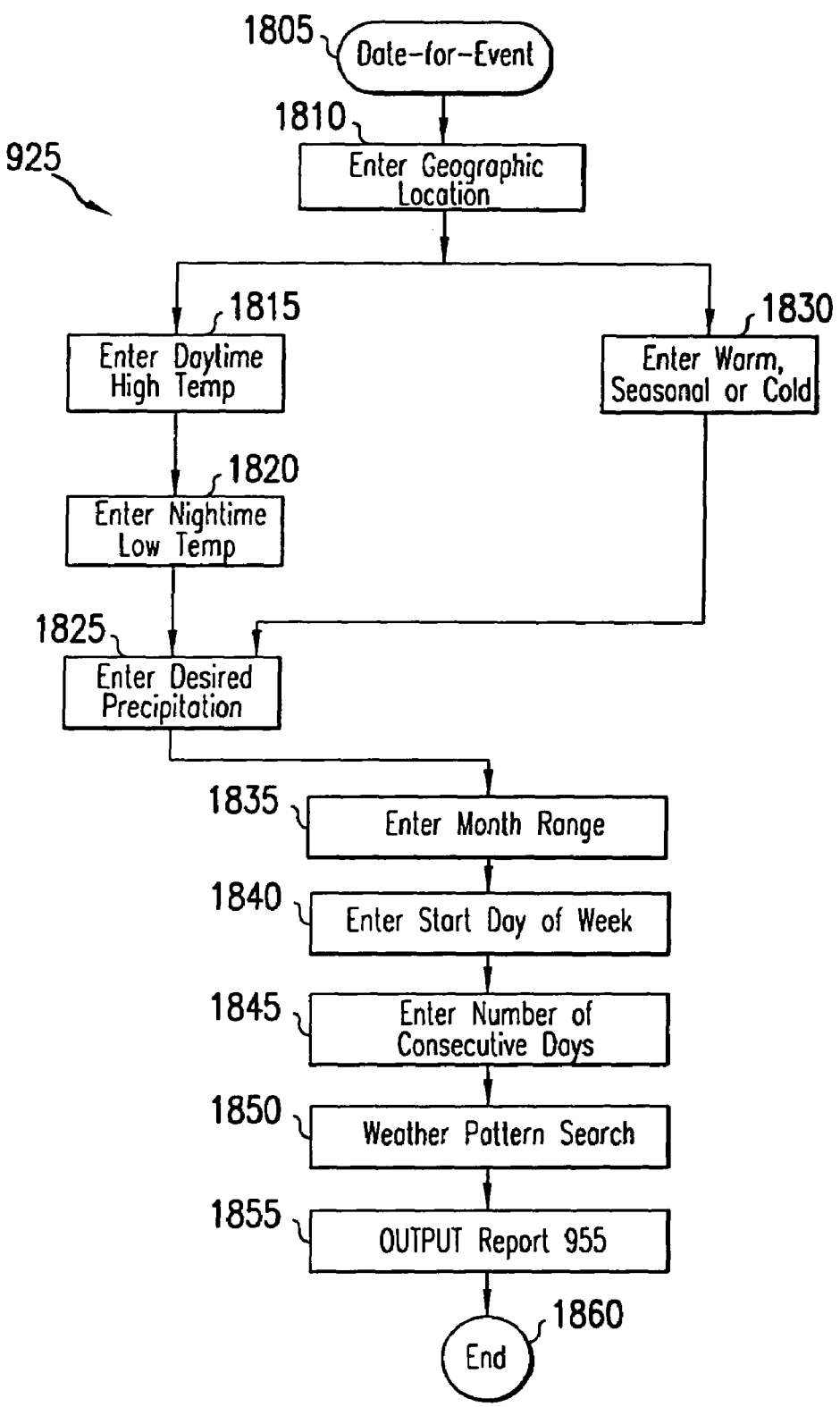
FIG. 18 is a flowchart illustrating the detailed operation of a Date-for-Event module according to an embodiment of the present invention.

Date-for-Event module 925 may be used by a user, if he is sure of where he is going to be and what kind of weather he desires. Activities planning system 105 causes a report 955 to be outputted to the user that will assist in determining the best time for the future event. Referring to FIG. 18, a flowchart illustrating the detailed operation of the Date-for-Event module 925 is shown. Date-for-Event module 925, after being selected via the main menu 910, begins at step 1805 with control passing immediately to step 1810. In step 1810, the user enters his desired geographic location. Step 1810 functions as described above with reference to FIG. 10 (step 1010) and the GUI screen of FIG. 11.

After entering a preferred geographic location, the user faces a choice. In step 1830, the user may either enter warm, seasonal, or cold as his desired weather. Alternately, the user may enter a daytime high temperature and a nighttime low temperature as indicated by steps 1815 and 1820, respectively. In step 1825, the user is prompted to select the desired precipitation level. Steps 1815–1830 function in the same manner as steps 1430–1440, respectively, as described above with reference to FIG. 14. Further, the exemplary GUI screen for allowing the user to enter the desired weather, as shown in FIG. 15, may also be used for the Date-for-Event module 925.

After the user specifies the type of weather he desires, either by steps 1815–1820, or by step 1830, the user must specify a desired date range (i.e., time period). In step 1835, the user is asked to enter a month range (i.e., one month or a plurality of months). In a preferred embodiment of the present invention, the user may select a month range of either one, two or three consecutive months in which the weather pattern search will eventually search.

Figure 19:
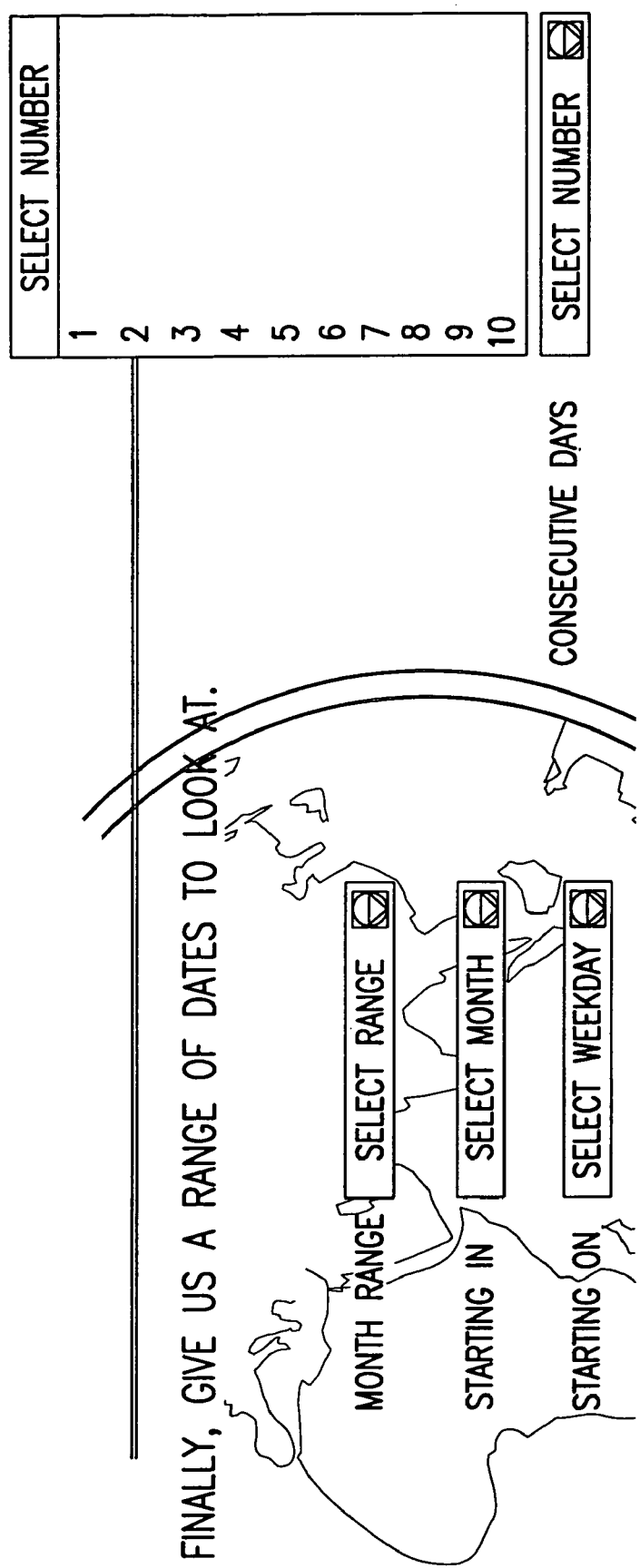
FIG. 19 is a screen shot depicting an exemplary graphical user interface input screen for the activities planning system according to an embodiment of the present invention.

Proceeding to step 1840, the user is asked to enter the day of the week in which to start searching. The day of the week may be specified by any day (i.e., Sunday through Saturday). In step 1845, the user is asked to enter a number of consecutive days in which to search. In a preferred embodiment of the present invention, the number of consecutive days in which to search is limited to ten days (for simplicity of outputting report 955). An exemplary GUI screen for allowing the user to enter the desired date range (steps 1835–1845) is shown in FIG. 19.

In step 1850, weather pattern search functions using the future data within weather patterns database as described in detail in the commonly-owned U.S. patent application Ser. No. 09/126,1950, filed Jul. 31, 1998 entitled, "System, Method and Computer Program Product for Weather Adapted, Consumer Event Planning," incorporated herein by reference in its entirety. Date-for-event module 925 then proceeds to step 1855. In step 1855, output report 955 is generated. Date-for-event module 925 then ends as indicated by step 1860.

Figure 20:
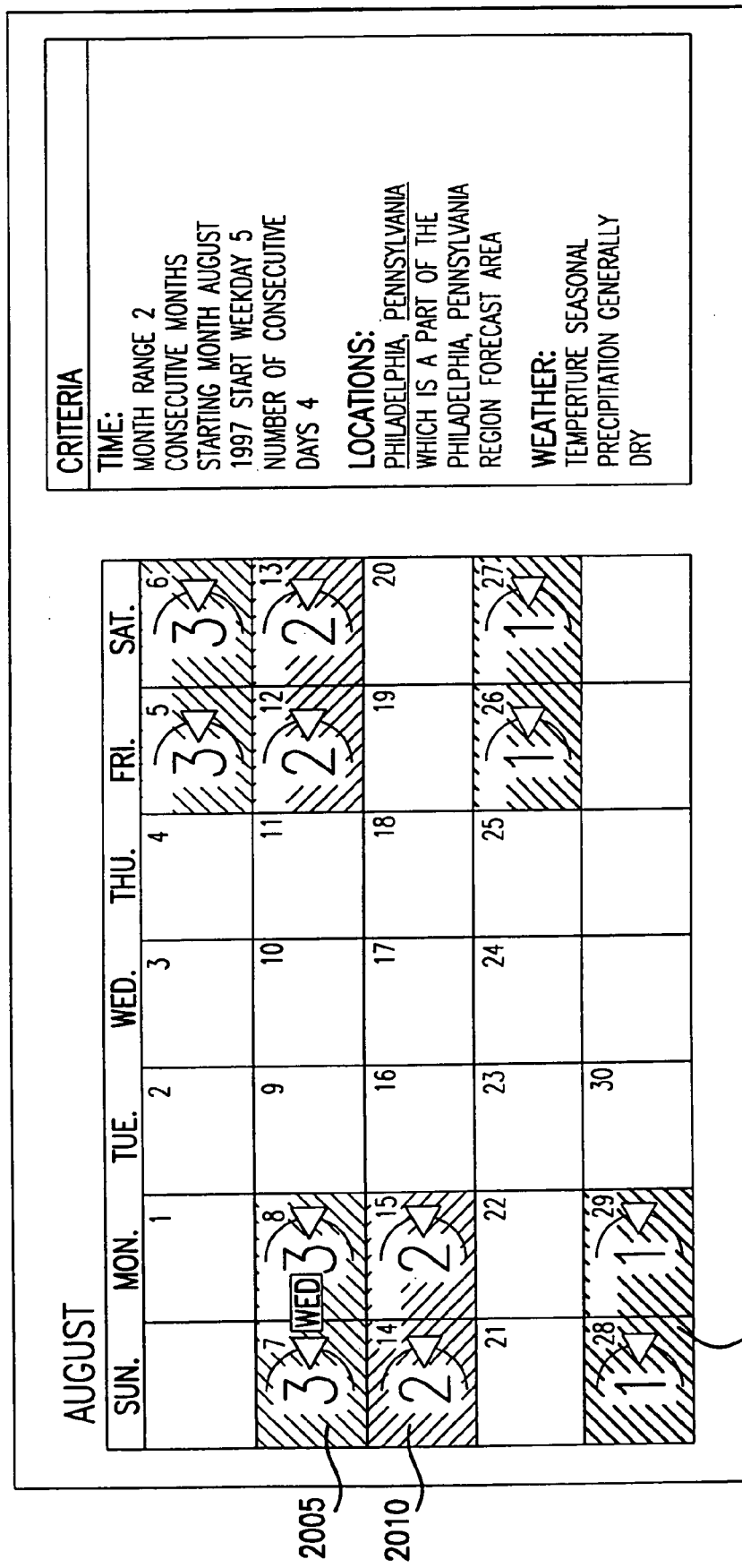

Referring to FIGS. 20 and 21, an exemplary output report 955 for the Date-for-Event module 925 is shown. In FIG. 20, the criteria entered from steps 1810–1845 are summarized on the right side of a first page of the report 955. The rankings (i.e., first 2015, second 2010, and third 2005), which are explained in detail below, which are returned by the weather pattern search results are reflected in a calendar on the left side of the first page of the report 955. In FIG. 21, a detailed weather plan is given on a second page of the report 955 for the time period which ranks first according to the weather pattern search results. It should also be noted that the output report 955 may return an empty calendar if no date matches the criteria selected by the user.

In an alternate embodiment of the present invention, the activities planning system 105 will prompt the user for the specific special event (e.g., golfing, skiing, wedding, etc.) he is planning. In such an embodiment, each of the output reports 945, 950 and 955 may be customized accordingly.

E. Weather Pattern Search for Location-for-Event and Date-for-Event

As mentioned above, Location-for-Event module 920 and Date-for-Event module 925 make use of a weather pattern search. Weather pattern search uses the future data within a weather patterns database. However, activities planning system 105 employs a 24 hour "leeway" during the Location-for-Event module 920 and the Date-for-Event module 925. That is, in some embodiments, the time period entered by the user is modified by ±1 day. Thus, an inputted time period of Jul. 10, 1999 to Jul. 13, 1999 (e.g., steps 1910–1915) will actually be searched as Jul. 9, 1999 to Jul. 14, 1999 in the weather forecast database 215.

Furthermore, if a user desires "warm" days over a four day period, the weather pattern search has to resolve "conflicts" over competing like weather (i.e., warm) periods within a month. That is, a situation may occur where a consecutive number of seven warm days and a consecutive number of five warm days are separated by a few cool days. To resolve such conflicts, the period of seven days is given a greater weight in order to arrive at the rankings shown, for example, in FIG. 20.

To arrive at rankings, activities planning system 105 preferably uses a weather period of at least two consecutive days with temperatures matching the desired weather (i.e., warm). In a preferred embodiment, weight assignments are then made to each of the days using a "pyramid" fashion starting from the tail ends being assigned the value of 1. For a four day period (which is turned into a six day period due to the ±1 day leeway), each day is weighted from the center to the tails as 1, 2, 3, 3, 2 and 1. Each day's weight reflects the number of warm days surrounding it. The weight for the period is then the sum total for the interval (i.e., 12). So when a user desires a warm period the Location-for-Event module 920 and the Date-for-Event module 925 can evaluate like (competing) warm periods using the weights. For example, the weight of 12 may be compared to smaller or larger warm periods so it can be ranked in the output reports 950 and 955. Ties in the rankings are simply reported in the output reports 950 and 955. As will be apparent to one skilled in the relevant art(s), the same pyramid weighting heuristic can be used for precipitation.

In the above, example values have been provided for a number of elements, such as but not limited to intervals, time period offsets, periods, etc. These values have been provided for illustrative purposes only. Thus, the invention is not limited to these values.

F. Then-What Module

The Then-What module 975 may be used by a user, if the user is not satisfied with the results of either Weather-for-Event module 915, Location-for-Event module 920 or Date-for-Event module 925. Activities planning system 105 causes a report to be outputted to the user that will assist in determining the desired information. The report can be report 945, report 950 or report 955, dependant on which module (915–925) the user executes.

The commercial value of the present invention involves charging a user a fee for executing some of the modules shown in FIG. 9. A goal of the present invention is to provide a user with his desired information so that the user will repeatedly use the present invention. Therefore, to increase the probability that a user receives his desired information each time a module is executed, the present invention provides a Then-What module 975. The user can execute the Then-What module 975 for no additional charge, or for some other, preferably nominal charge. Typically, a user executes the Then-What module 975 when he is not satisfied with the information received from the Weather-for-Event module 915, the Location-for-Event module 920 or the Date-for-Event module 925, but this aspect of the invention is applicable to other modules.

Figure 22:
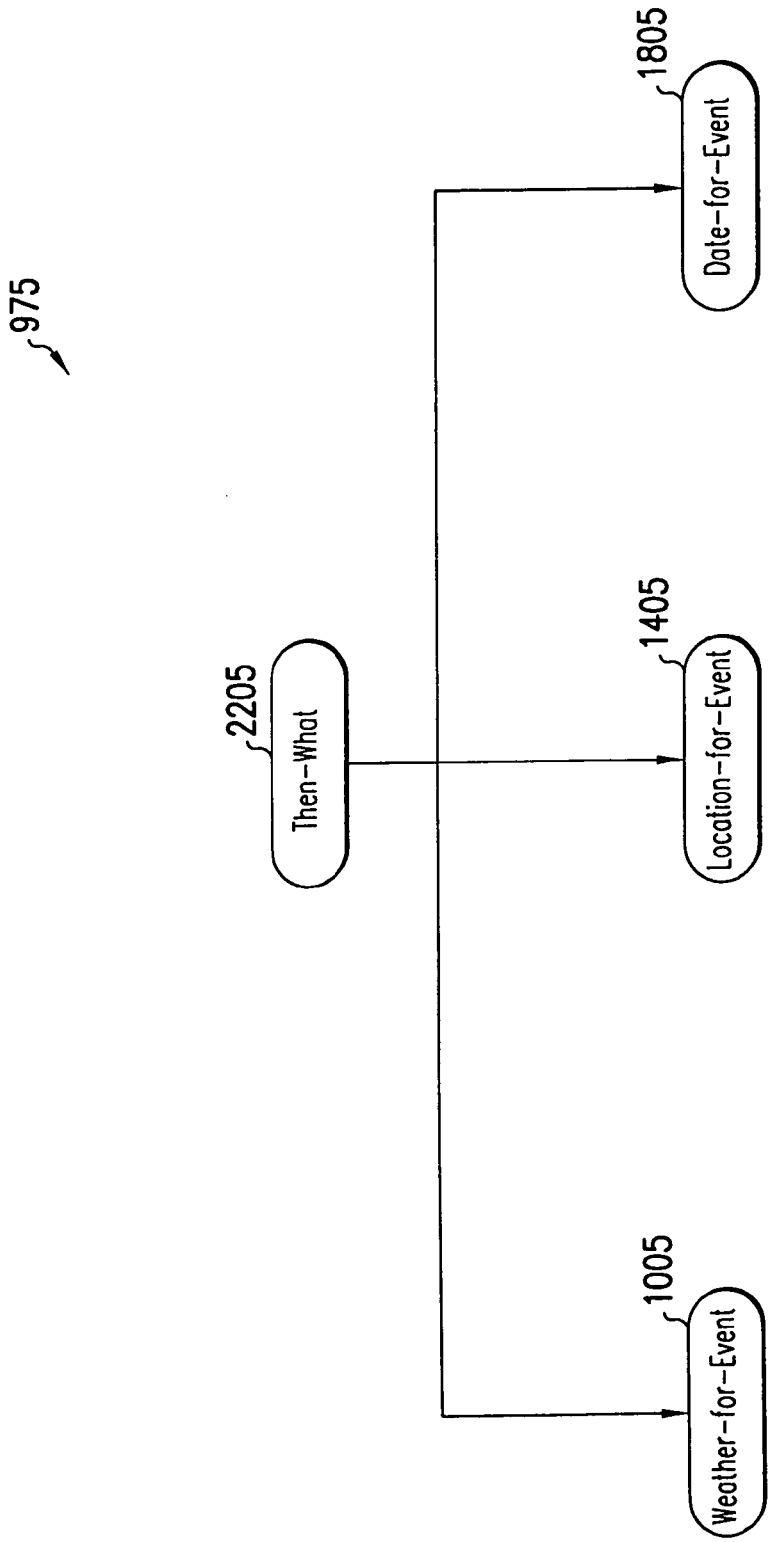
FIG. 22 is a flowchart illustrating the operation of a Then-What module according to an embodiment of the present invention.

Referring to FIG. 22, a flowchart illustrating the operation of the Then-What module 975 is shown. Then-What module 975, after being selected via the main menu 910, begins at step 2205 with control passing immediately to either step 1005 (Weather-for-Event from FIG. 10), step 1405 (Location-for-Event from FIG. 14) or step 1805 (Date-for-Event from FIG. 18). For example, as described above, output report 950 for Location-for-Event module 920 may return an empty calendar if no location matches the criteria selected by the user. In this situation it is likely the user will feel he did not get his desired information, namely a location that matches the user's desired weather conditions and time period. Then-What module 975 provides the user with another opportunity to get his desired information for no additional charge.

G. Weather-Feel Module

Figure 23:
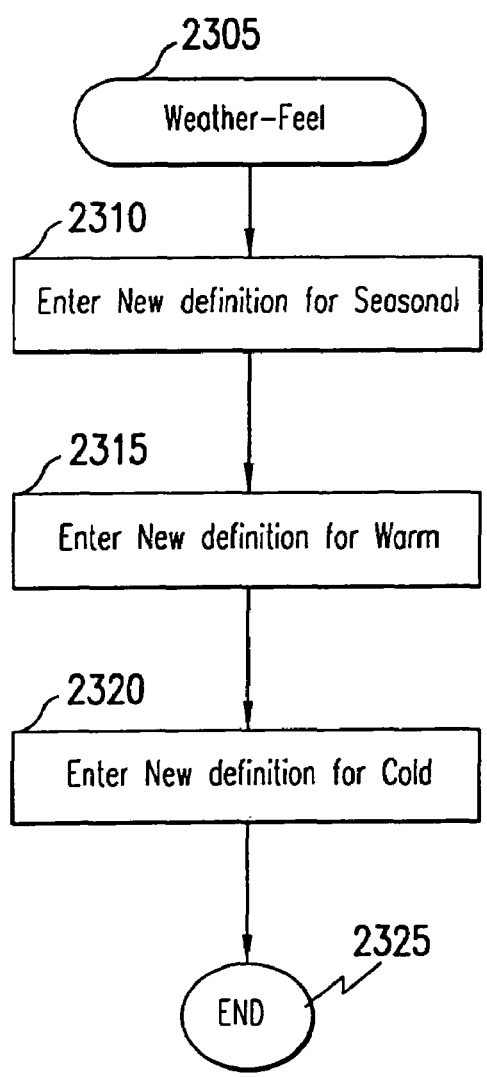
FIG. 23 is a flowchart illustrating the operation of a Weather-Feel module according to an embodiment of the present invention.

Weather-Feel module 985 may be used by a user to redefine weather parameters (used by the other modules) such that the weather forecast provided by the present invention is tailored for each user. Referring to FIG. 23, a flowchart illustrating the detailed operation of the Weather-Feel module 985 is shown. Weather-Feel module 985, after being selected via the main menu 910, begins at step 2305 with control passing immediately to step 2310. In step 2310, the user is prompted to enter a new definition for the weather parameter 'Seasonal.' The default definition for seasonal for a particular geographic location is what ever the average person living at that particular geographic location would consider about normal or routine for the time of the year. As mentioned above, seasonal weather for the month of June in Pennsylvania is very different from what is seasonal weather in Florida. The Weather-Feel module 985 allows the user to redefine 'Seasonal' to reflect what the user believes is seasonal weather. Therefore, the Pennsylvanian may redefine 'Seasonal' for Florida in June to be a daytime high of 75 degrees (replacing the true daytime high of 100 degrees definition of 'Seasonal' weather for Florida in June).

After entering a new definition for 'Seasonal,' the user is asked to enter a new definition for 'Warm' in step 2315. Finally in step 2320, the user is asked to enter a new definition for 'Cold.' Weather-Feel module 985 is thus completed as indicated by step 2325.

H. Weather Calendar Module

Figure 24:
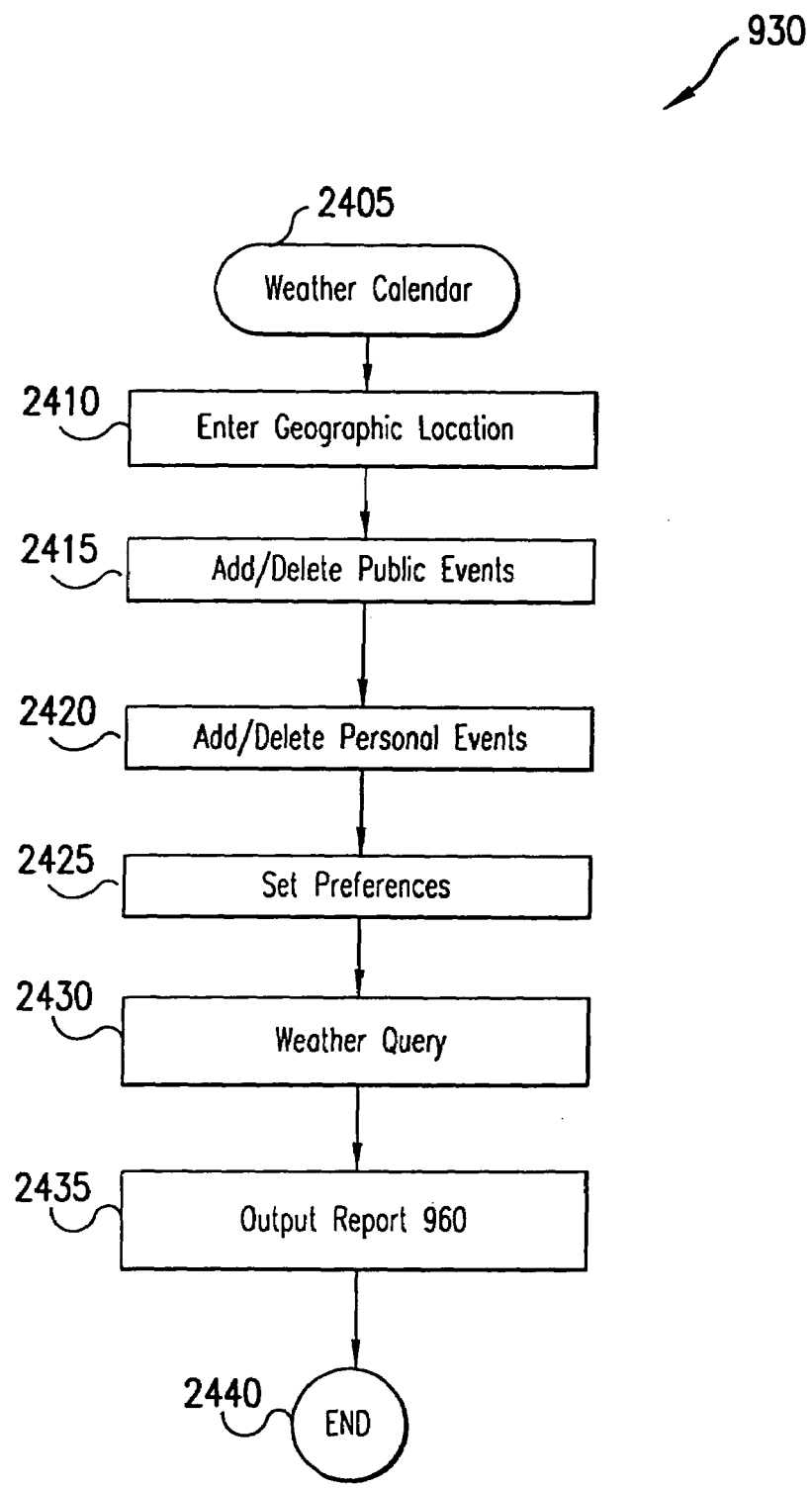
FIG. 24 is a flowchart illustrating the operation of a Weather Calendar module according to an embodiment of the present invention.

Weather Calendar module 930 may be used by a user to display a local calendar of forecasted weather for any North American location. This includes forecasts for a rolling number of days, and the ability to "inhale" local or public content for any city. Activities planning system 105 causes a report 960 to be outputted to the user that will show how the weather and the user's personal calendar will match up, and then take appropriate action. Referring to FIG. 24, a flowchart illustrating the detailed operation of the Weather Calendar module 930 is shown. Weather Calendar module 930, after being selected via the main menu 910, begins at step 2405 with control passing immediately to step 2410. In step 2410, the geographic location may be identified as a state or province, a city or town or by zip code, or any combination thereof. The zip code will override any entered state or city selections. In alternate embodiments, the geographic location may also be specified, for example, from a list of vacation hot-spots, cities most frequently visited for business purposes, and the like. An exemplary GUI screen for allowing the user to enter the desired geographic location is shown in FIG. 11.

After entering the geographic location, the user is presented with the choice of adding or deleting public events in step 2415. As stated above, the user is given the opportunity to "draw in" public events into his personal weather calendar. Activities planning system 105 utilizes a public event record (external information source 230) to determine the public events for the geographic location. Such a public event record was described in reference to FIG. 7 above.

Examples of how the user can add and delete a public event is described next. First of all, the user must be informed of the possible public events that he can "inhale" into his weather calendar. Ways of informing the user of public events include, but are not limited to, through pull-down menus, by listing all of the public events in the user's calendar, and so forth. The public events may also be filtered into groups, including sporting events, plays, community service functions, children functions, etc. Here, the user may filter out the groups of public events he is not interested in being informed of. Next, the user is given the opportunity to add his desired public events to his weather calendar. Again, this can be accomplished in a number of different ways. For example, the user may have to highlight a particular public event and drag it to his calendar, or simply highlight a particular public event and double click to put the event on his calendar, and so forth. Finally, a user may decide to delete a public event from his calendar. Here, the user may have to highlight the public event (already on his weather calendar) and drag it off of his calendar, or highlight the public event and click on a 'delete' button, and so forth.

Activities planning system 105 then proceeds to step 2420. In step 2420, the user is presented with the choice of adding or deleting personal events to his weather calendar. Examples of personal events include doctor appointments, hair appointments, days off from work, and the like. As with public events described above, there exist many ways in which a user may add personal events to his weather calendar. The user may just click in the desired date on his calendar and simply type in text relating to the time and type of personal event. The present invention may also present the user with icons representing common personal appointments, including doctor appointments, days off of work, etc. Ways in which the user can delete a personal event are the same as described in reference to public events above.

In step 2425, the user is presented with the choice of setting preferences.

Preferences may include any number of things, including the type of graphical representation for the weather calendar, the colors displayed, etc. Examples of how preferences can be set will be described further in reference to FIG. 25 below.

Activities planning system 105 then proceeds to step 2430. In step 2430, a weather query is performed. Using the inputs entered by the user (i.e., steps 2410–2425), the weather query searches for the weather for the specified geographic location within weather forecast database 215, as described above. In step 2435, an output report 960 is generated. Weather Calendar module 930 is thus completed as indicated by step 2440.

Figure 25:
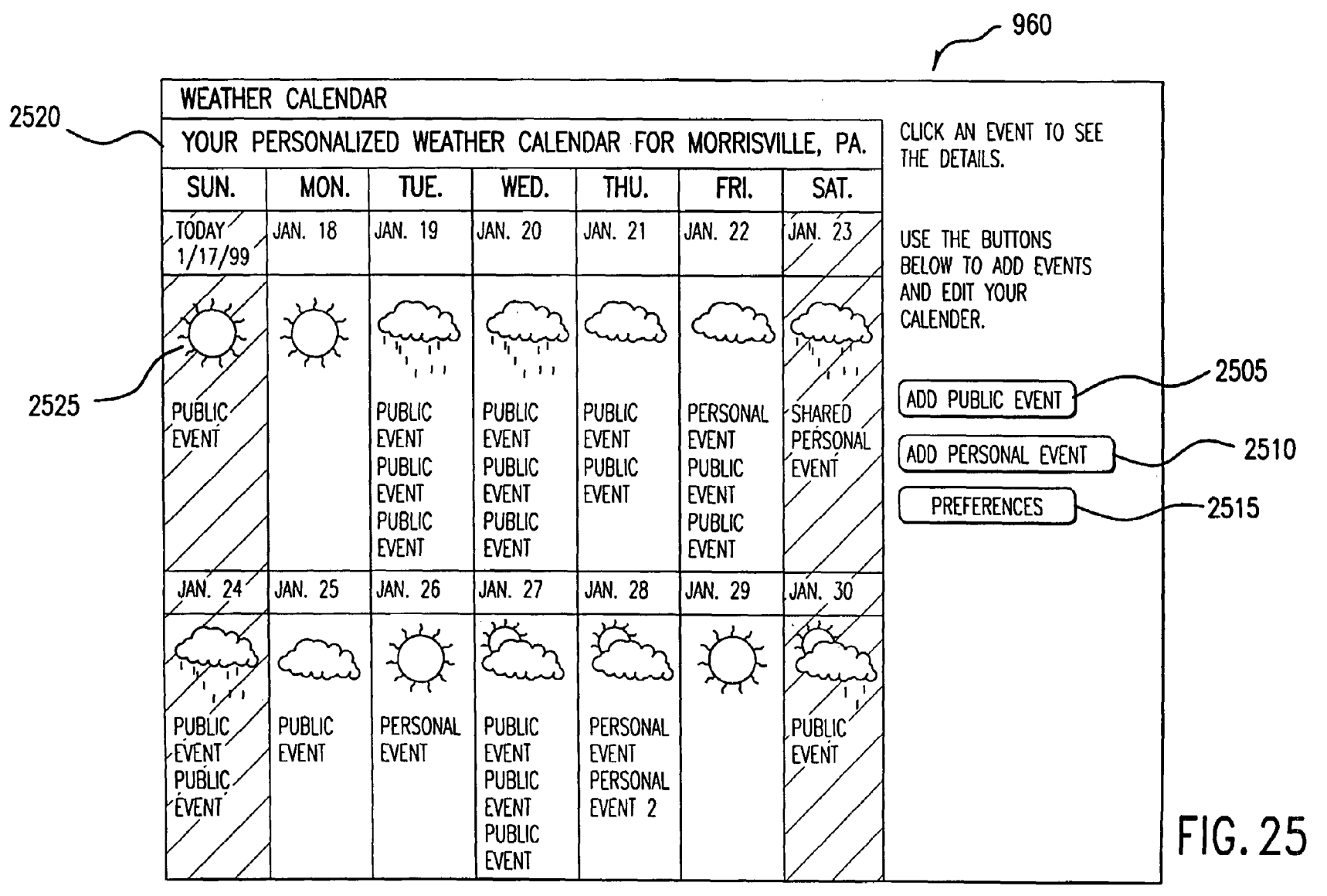

Referring to FIG. 25, an exemplary output report 960 for the Weather Calendar module 930 is shown. The geographic location entered in step 2410 is summarized on a banner portion 2520 of report 960. Report 960 also includes the forecasted weather determined from step 2430 for a rolling (e.g., always 20 days from the current date) number of days indicated by weather icons 2525. Button 2505 provides the user with a graphical means to add/delete a public event in step 2415. In a similar manner, button 2510 provides the user with a graphical means to add/delete a personal event in step 2420. Button 2515 provides a graphical means to set preferences. Examples of setting preferences include replacing weather icons 2525 with text to indicate the forecasted weather, altering the number of days displayed in report 960, changing the geographic location for report 960, etc.

I. Heads-Up Module

Figure 26:
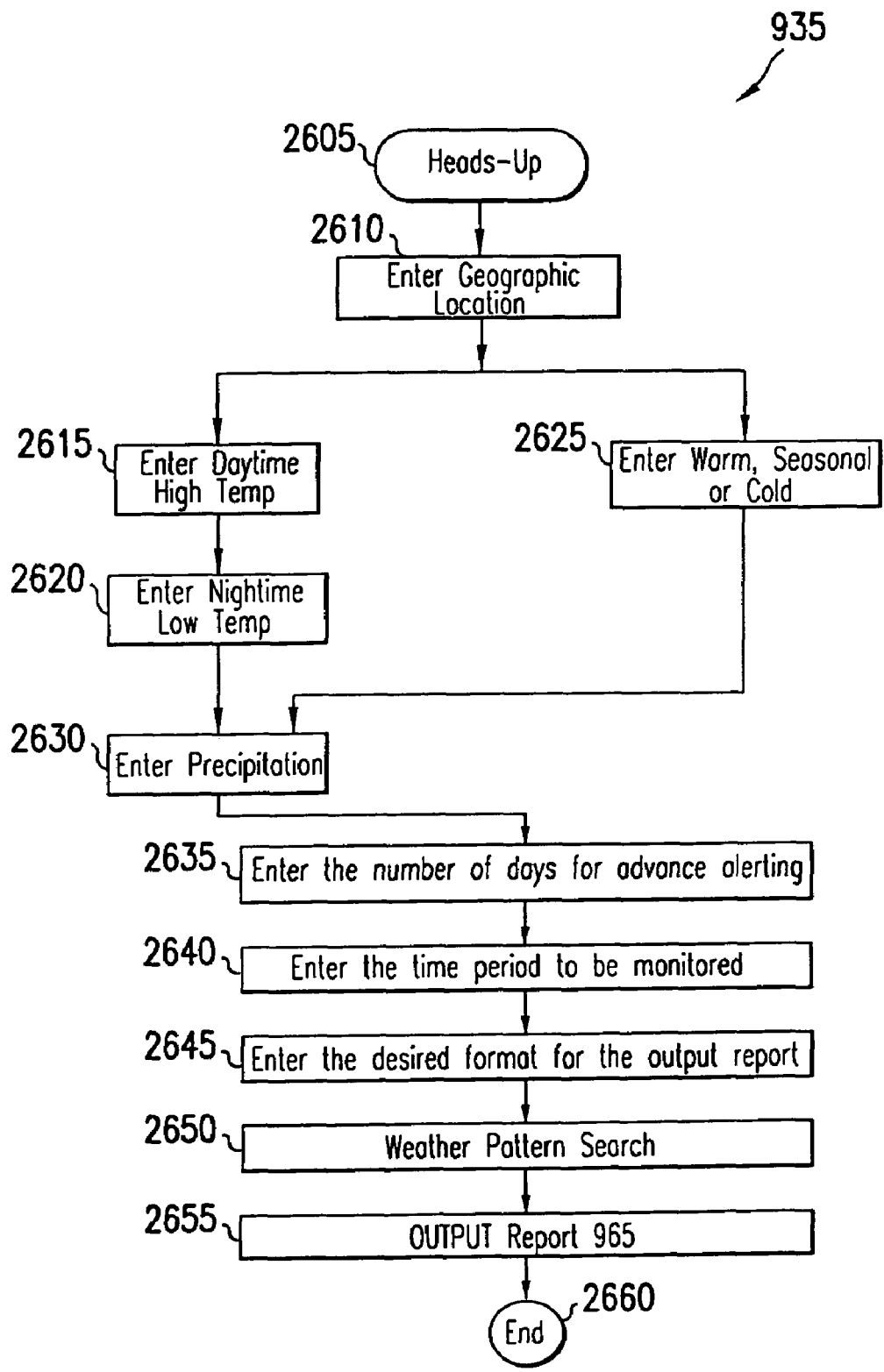
FIG. 26 is a flowchart illustrating the operation of a Heads-Up module according to an embodiment of the present invention.

Heads-Up module 935 may be used by a user to receive weather alerts for user-defined weather conditions and geographic locations. Activities planning system 105 causes a report 965 to be outputted to the user in the form of an e-mail message or a warning displayed on the user's personalized weather calendar. Referring to FIG. 26, a flowchart illustrating the detailed operation of the Heads-Up module 935 is shown. Heads-Up module 935, after being selected via the main menu 910, begins at step 2605 with control passing immediately to step 2610. In step 2610, the geographic location is entered as described above in reference to the Weather Calendar module 930.

After entering a geographic location, the user faces a choice. In step 2625, the user may either enter warm, seasonal, or cold as his desired weather. Alternately, the user may enter a daytime high temperature and a nighttime low temperature as indicated by steps 2615 and 2620, respectively. In step 2630, the user is prompted to select the desired precipitation level. Again, the precipitation level may be significant rain, non-significant rain, significant snow, non-significant snow, non-significant rain or snow, or any precipitation. Other ways to enter weather criteria can also be used, such as the techniques discussed elsewhere herein. Steps 2615–2630 function in the same manner as steps 1430–1440, respectively, as described above with reference to FIG. 14. Further, the exemplary GUI screen for allowing the user to enter the desired weather, as shown in FIG. 15, may also be used for the Heads-Up module 935.

Heads-Up module 935 the proceeds to step 2635. In step 2635, the user enters the desired number of days for advance alerting of the type of weather specified in steps 2615–2630. An example of this would be if the user wants alerted three days in advance of when there will be one or more inches of snow in the geographic location of Philadelphia, Pa. In step 2640, the user enters the time period to be monitored. The time period may be specified as a starting date and an ending date. Typically, the starting and ending dates are specified in the conventional terms of month, day and year.

In step 2645, the user enters the desired format for output report 965. Output report 965 can be in the form of an e-mail message, as an alert displayed on the user's personalized weather calendar described above in reference to Weather Calendar module 930 and exemplary output report 960 (FIG. 25), or any other format that conveys to the user his desired information.

Heads-Up module 935 then proceeds to step 2650, where a weather pattern search is performed using the future data within a weather patterns database, as described in reference to the Location-for-Event module 920. After the weather pattern search is performed, an output report 965 is generated in step 2655. As described above, in step 2635, the user may enter that he desires three days advance alerting of one or more inches of snow in Philadelphia. Once activities planning system 105 does the weather pattern search and determines which days Philadelphia will have one or more inches of snow, output report 965 is generated three days in advance of each one of these determined days. For example, if activities planning system 105 determines one or more inches of snow for Philadelphia on November 8, November 10 and December 4, output report 965 will be generated and displayed to the user on November 5, November 7 and December 1. Heads-Up module 935 then ends as indicated by step 2660.

J. Activities Module

Activities module 940 may be used by a user to receive information about a variety of activities that are affected by the weather. Such activities include sports, horoscope, health, finance, etc. Activities planning system 105 causes a report to be outputted to the user where the report is modified to reflect the type of activity desired by the user.

Figure 27:
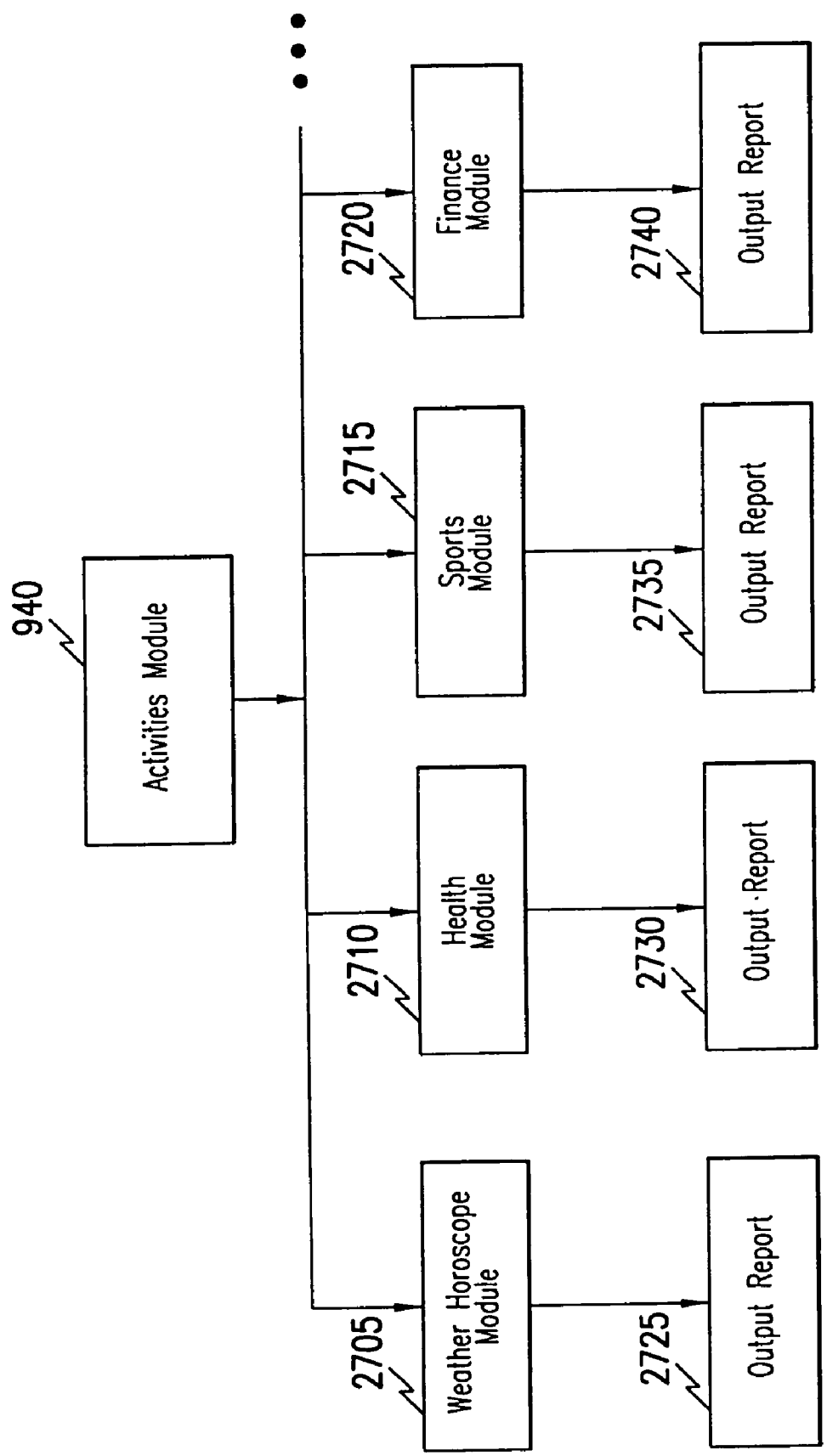
FIG. 27 depicts the manner in which users may navigate through functions and services provided by an Activities module according to an embodiment of the present invention.

FIG. 27 depicts the manner in which users may navigate through functions and services provided by an Activities module 940 according to an embodiment of the present invention. In a preferred embodiment, the Activities module 940 of activities planning system 105 provides four modules: a Weather Horoscope module 2705; a Health module 2710; a Sports module 2715; and a Finance module 2720. These four modules, accessible via a main menu 910 linked to the GUI 905, are first described briefly below and then in detail with reference to FIGS. 28–33, respectively. These modules are described for illustrative purposes. The invention is not limited to these modules.

Weather Horoscope module 2705 may be used by a user, if he knows the date and time he was born. Activities planning system 105 causes a report 2725 to be outputted with text and graphics reporting the user's weather horoscope.

Health module 2710 may be used by a user, if he wants to be informed about how forecasted weather for geographic locations is likely to impact various health conditions, including allergies, arthritis, and the like. Activities planning system 105 causes a report 2730 to be outputted with text and graphics reporting the user's desired information.

Sports module 2715 may be used by a user, if he wants to be informed about how forecasted weather for geographic locations is likely to impact various sports, including golf, skiing, and the like. Activities planning system 105 causes a report 2735 to be outputted with text and graphics reporting the user's desired information.

Finance module 2720 may be used by a user, if he wants to be informed about how forecasted weather for geographic locations is likely to impact various financial conditions, including chain store sales, the stock market, and the like. Activities planning system 105 causes a report 2740 to be outputted with text and graphics reporting the user's desired information.

1. Weather Horoscope Module

Figure 28:
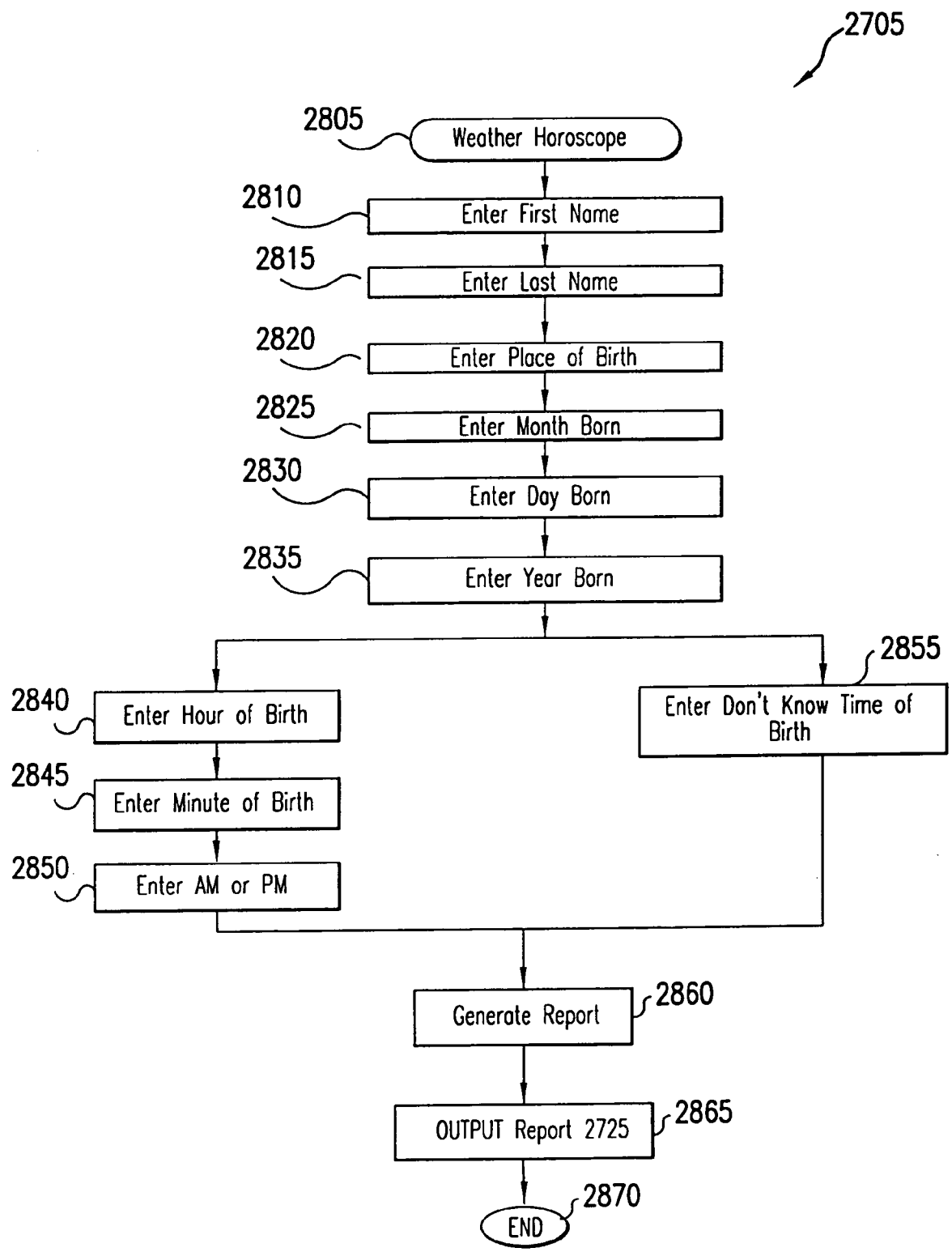
FIG. 28 is a flowchart illustrating the operation of a Weather Horoscope module (of the Activities module) according to an embodiment of the present invention.

Weather Horoscope module 2705 may be used by a user, if he knows the date and time he was born to receive a comprehensive weather horoscope. Referring to FIG. 28, a flowchart illustrating the detailed operation of the Weather Horoscope module 2705 is shown. Weather Horoscope module 2705, after being selected via the main menu 910, begins at step 2805 with control passing immediately to step 2810. In step 2810, the user is prompted to enter his first name. In step 2815, the user is prompted to enter his last name. The user is then prompted to enter his place of birth in step 2820. In a preferred embodiment, the user only enters the city in which he was born.

After entering his place of birth, the user is prompted for the month, day and year born in steps 2825–2835. Next, the user is presented with a choice of how to enter the time of day he was born. The first option is to enter the hour, minute and AM/PM in steps 2840–2850. Alternately, if the user does not know the time in which he was born, the user may simply indicate that he does not know the time born in step 2855. An exemplary GUI screen for allowing the user to enter the requested information (steps 2810–2855) is shown in FIG. 29.

Activities planning system 105 then proceeds to step 2860 in which a report is generated. In step 2865, the format of output report 2725 is sufficiently flexible and configurable such that users may receive reports in formats including text, graphs, charts, and the like. Weather Horoscope module 2705 is thus completed as indicated by step 2870.

2. Health Module

Health module 2710 may be used by a user, if he wants to be informed about how forecasted weather for geographic locations is likely to impact various health conditions, including allergies, arthritis, and the like. In one embodiment, the user is not requested for specific inputs or data except an indication of which particular weather-impacted health condition the user desires to receive information about. Health data used by Health module 2710 is stored in activities database 220. In another embodiment, the user is prompted to enter data such as a desired geographic location and a time period. The exemplary GUI screen for allowing the user to enter the desired geographic location, as shown in FIG. 11 and described above, may also be used in the Health module 2710. In addition, the exemplary GUI screen for allowing the user to enter the desired time period, as shown in FIG. 12 and described above, may also be used in the Health module 2710.

Figure 37:
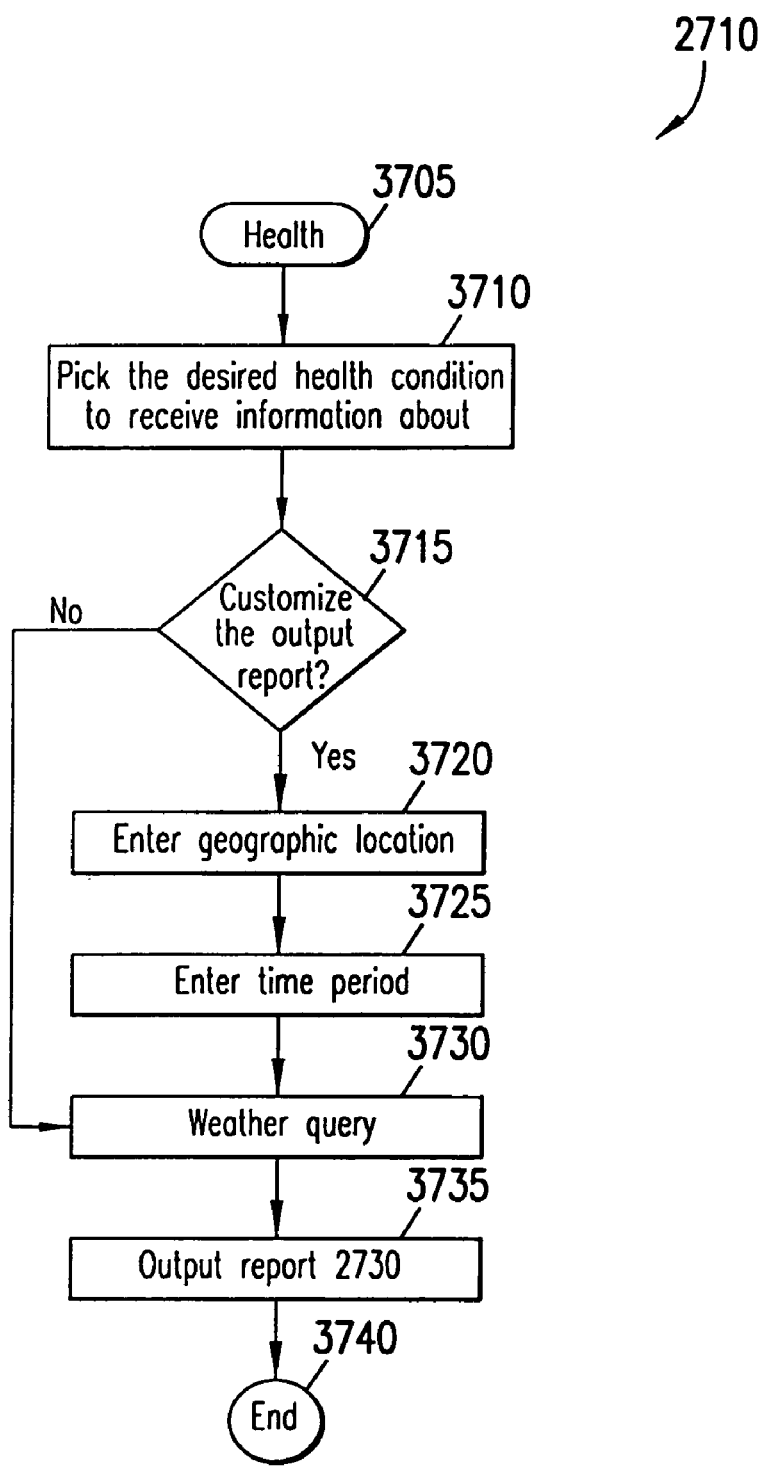
FIG. 37 is a flowchart illustrating the detailed operation of a Health module (of the Activities module) according to an embodiment of the present invention.

Referring to FIG. 37, a flowchart illustrating the detailed operation of the Health module 2710 is shown. Health module 2710, after being selected via the main menu 910, begins at step 3705 with control passing immediately to step 3710. In step 3710, the user picks the desired health condition (e.g., allergies, arthritis, cold and flu, etc.) that he wants to receive information about. After picking the desired health condition, the user is asked whether he wants to customize the output report 2730 in step 3715. If the user does not care to customize the output report, then control passes to step 3730. Here, activities planning system 105 uses a default geographic location(s) and time period. Alternately, if in step 3715 the user wants to customize the output report 2730, then control passes to step 3720. In steps 3720 and 3725, the user is prompted to enter a geographic location and time period, in a similar manner as described above in the Weather-for-Event module 915.

Activities planning system then proceeds to step 3730. In step 3730, a weather query is performed. The weather query searches for the forecasted weather for the specific geographic location(s) and time period within weather forecast database 215, as described above. In step 3735, an output report 2730 is generated. The output report 2730 is generated by activities planning system 105 by accessing activities database 220 to determine how weather affects the particular health condition picked by the user in step 3710. Health module 2710 is thus completed as indicated by step 3740.

Figure 30:
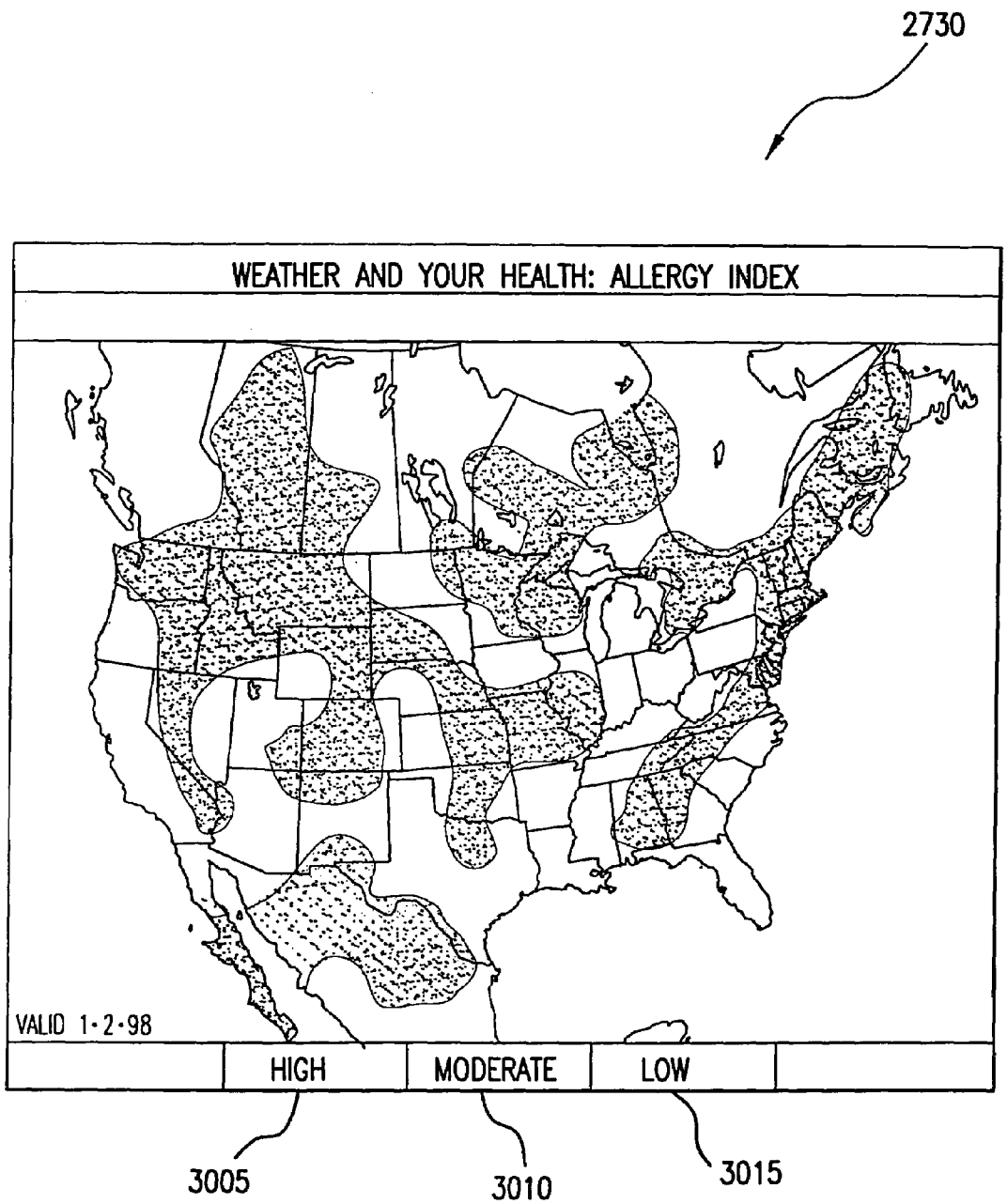
FIGS. 30 and 31 are screen shots depicting output report formats of a Health module (of the Activities module) according to an embodiment of the present invention.
Figure 31:
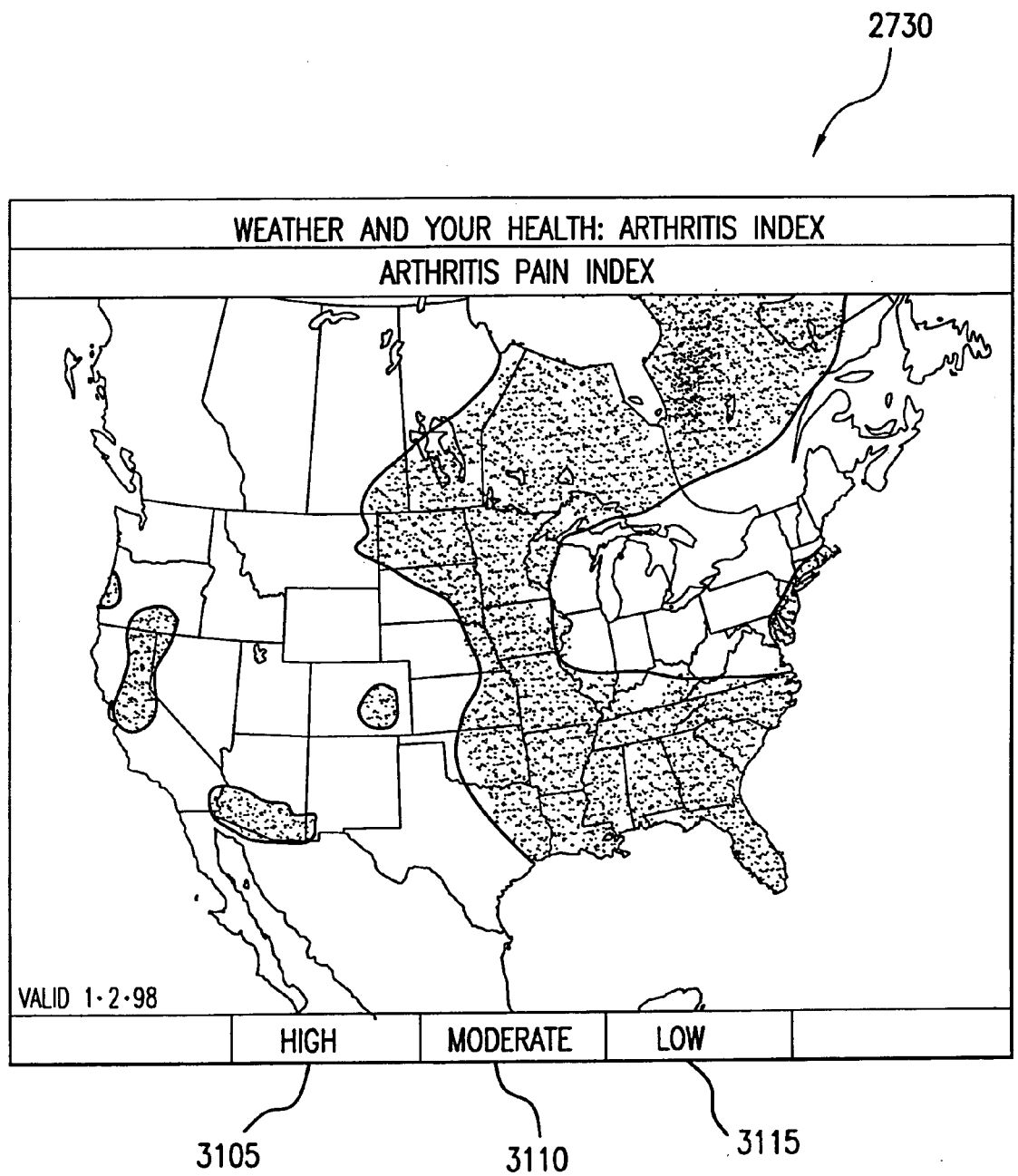

FIGS. 30 and 31 are exemplary screen shots depicting output report 2730 formats of the Health module 2710. FIG. 30 shows report 2730 conveying information related to the allergy index for North America. The High 3005, Moderate 3010 and Low 3015 indicated in FIG. 30 by different colors relates to the allergy index record (i.e., High Conditions, Moderate Conditions and Low Conditions) described in reference to FIG. 6 above. Referring again to FIG. 6, say for example that MSA 100 has forecasted weather of no precipitation and a temperature of above 80 degrees. This indicates that for MSA 100, there will be High allergy conditions. Referring back to FIG. 30, MSA 100 will be colored the color for High 3005.

FIG. 31 shows report 2730 conveying information related to the arthritis index for North America. Again, High 3105, Moderate 3110 and Low 3115 indicated in FIG. 31 by different colors relates to an arthritis index record similar to the one described in reference to FIG. 6 above. As with the allergy index record, the arthritis index record is also stored in activities database 220.

3. Sports Module

Sports module 2715 may be used by a user, if he wants to be informed about how forecasted weather for geographic locations is likely to impact various sports, including golf, skiing, and the like. As with the Health module 2710, in one embodiment, the user is not requested for specific inputs or data except an indication of which particular weather-impacted sport the user desires to receive information about. Sports data used by Sports module 2715 is stored in activities database 220. In another embodiment, the user is prompted to enter data such as a desired geographic location and a time period. The exemplary GUI screen for allowing the user to enter the desired geographic location (or specific ski location), as shown in FIG. 11 and described above, may also be used in the Sports module 2715. In addition, the exemplary GUI screen for allowing the user to enter the desired time period, as shown in FIG. 12 and described above, may also be used in the Sports module 2715.

Figure 38:
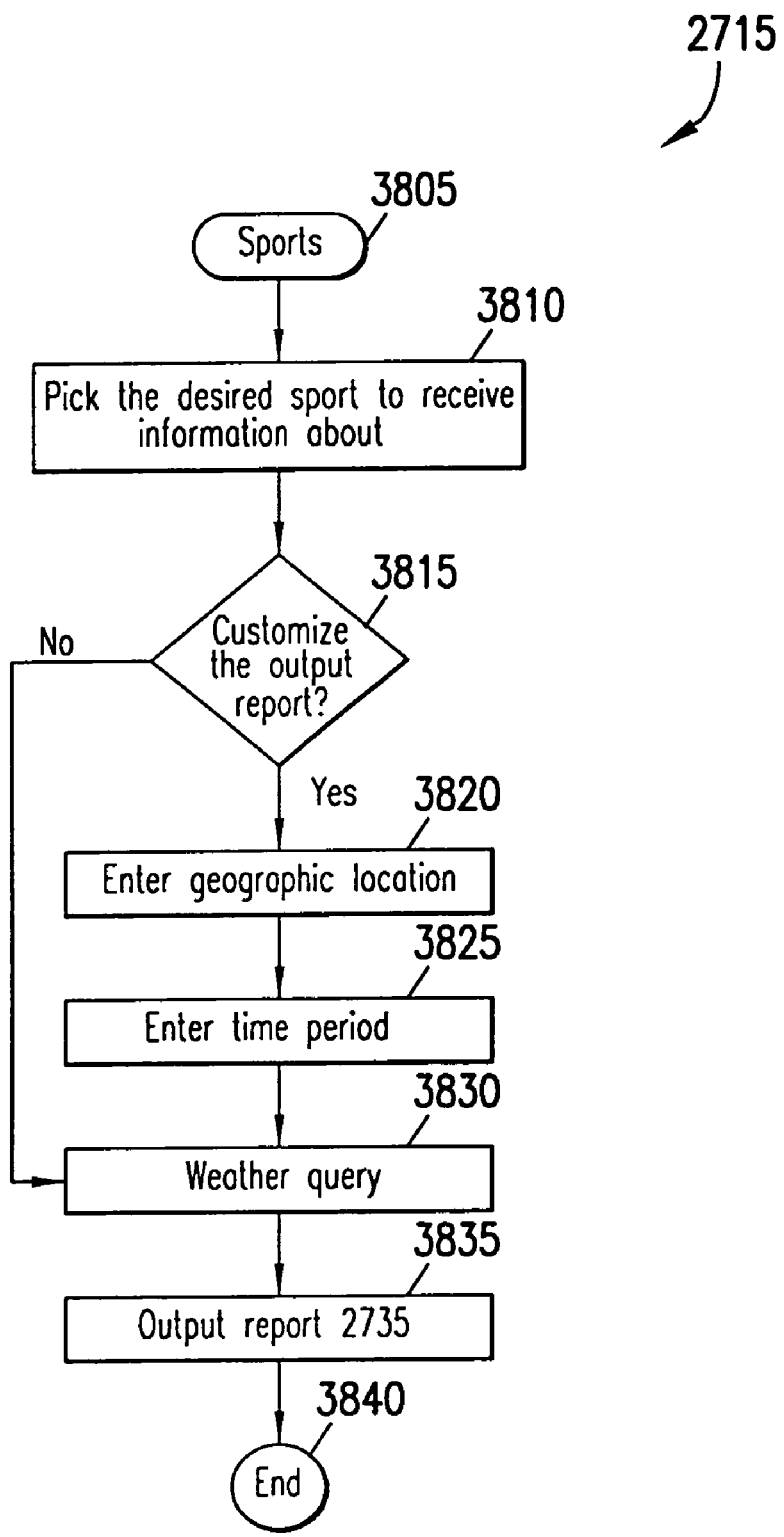
FIG. 38 is a flowchart illustrating the detailed operation of a Sports module (of the Activities module) according to an embodiment of the present invention.

Referring to FIG. 38, a flowchart illustrating the detailed operation of the Sports module 2715 is shown. Sports module 2715, after being selected via the main menu 910, begins at step 3805 with control passing immediately to step 3810. In step 3810, the user picks the desired sport (e.g., golf, skiing, etc.) that he wants to receive information about. After picking the desired sport, the user is asked whether he wants to customize the output report 2735 in step 3815. If the user does not care to customize the output report, then control passes to step 3830. Here, activities planning system 105 uses a default geographic location(s) and time period. Alternately, if in step 3815 the user wants to customize the output report 2735, then control passes to step 3820. In steps 3820 and 3825, the user is prompted to enter a geographic location and time period, in a similar manner as described above in the Weather-for-Event module 915.

Activities planning system then proceeds to step 3830. In step 3830, a weather query is performed. The weather query searches for the forecasted weather for the specific geographic location(s) and time period within weather forecast database 215, as described above. In step 3835, an output report 2735 is generated. The output report 2735 is generated by activities planning system 105 by accessing activities database 220 to determine how weather affects the particular sport picked by the user in step 3810. Sports module 2715 is thus completed as indicated by step 3840.

Figure 32:
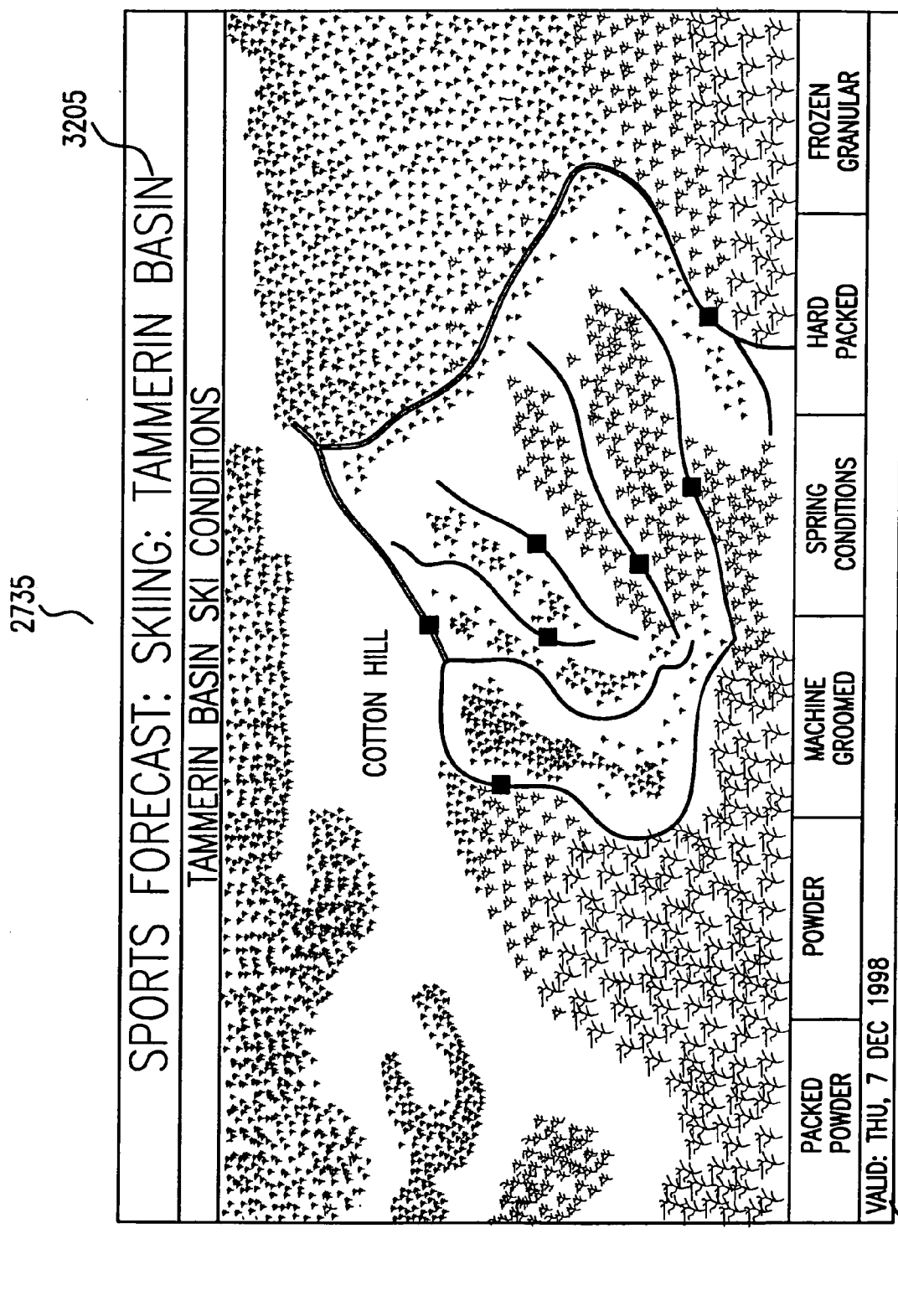
FIG. 32 is a screen shot depicting an output report format of a Sports module (of the Activities module) according to an embodiment of the present invention.

FIG. 32 is an exemplary screen shot depicting an output report 2735 format of the Sports module 2715. FIG. 32 shows report 2735 conveying information related to ski conditions at the Tammerin Basin. The particular geographic or ski location is indicated by banner 3205. The time period report 2735 is valid until is indicated by banner 3210.

4. Finance Module

Finance module 2720 may be used by a user, if he wants to be informed about how forecasted weather for geographic locations is likely to impact financial conditions, including chain store sales, the stock market, and the like. In one embodiment, the user is not requested for specific inputs or data except an indication of which particular weather-impacted sport the user desires to receive information about. Financial data used by Finance module 2720 is stored in activities database 220. In another embodiment, the user is prompted to enter data such as a desired geographic location and a time period. The exemplary GUI screen for allowing the user to enter the desired geographic location (or specific ski location), as shown in FIG. 1 and described above, may also be used in the Finance module 2720. In addition, the exemplary GUI screen for allowing the user to enter the desired time period, as shown in FIG. 12 and described above, may also be used in the Finance module 2720.

Figure 39:
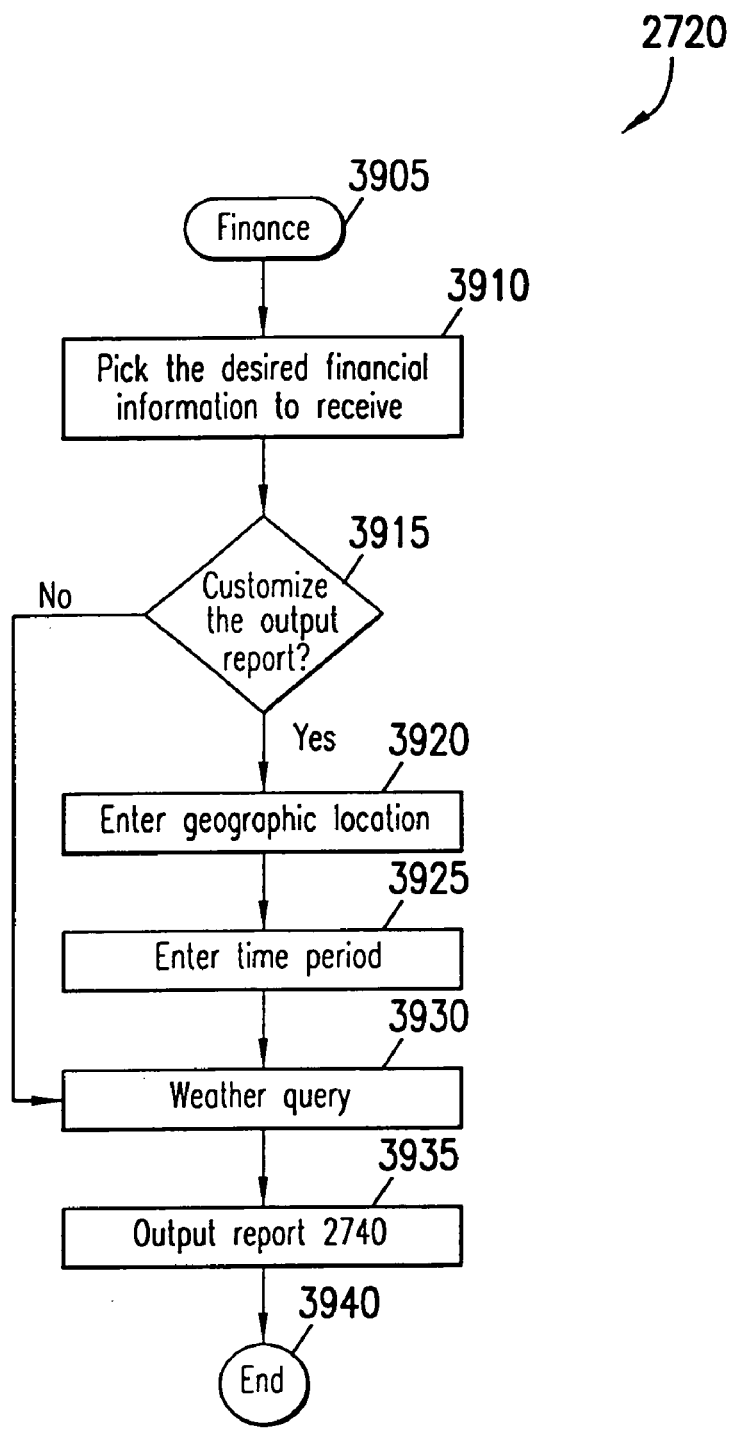
FIG. 39 is a flowchart illustrating the detailed operation of a Finance module (of the Activities module) according to an embodiment of the present invention.

Referring to FIG. 39, a flowchart illustrating the detailed operation of the Finance module 2720 is shown. Finance module 2720, after being selected via the main menu 910, begins at step 3905 with control passing immediately to step 3910. In step 3910, the user picks the desired financial information (e.g., stock market, retail sales, etc.) that he wants to receive information about. After picking the desired financial information, the user is asked whether he wants to customize the output report 2740 in step 3915. If the user does not care to customize the output report, then control passes to step 3930. Here, activities planning system 105 uses a default geographic location(s) and time period. Alternately, if in step 3915 the user wants to customize the output report 2740, then control passes to step 3920. In steps 3920 and 3925, the user is prompted to enter a geographic location and time period, in a similar manner as described above in the Weather-for-Event module 915.

Activities planning system then proceeds to step 3930. In step 3930, a weather query is performed. The weather query searches for the forecasted weather for the specific geographic location(s) and time period within weather forecast database 215, as described above. In step 3935, an output report 2740 is generated. The output report 2740 is generated by activities planning system 105 by accessing activities database 220 to determine how weather affects the particular financial information picked by the user in step 3910. Finance module 2720 is thus completed as indicated by step 3940.

Figure 33:
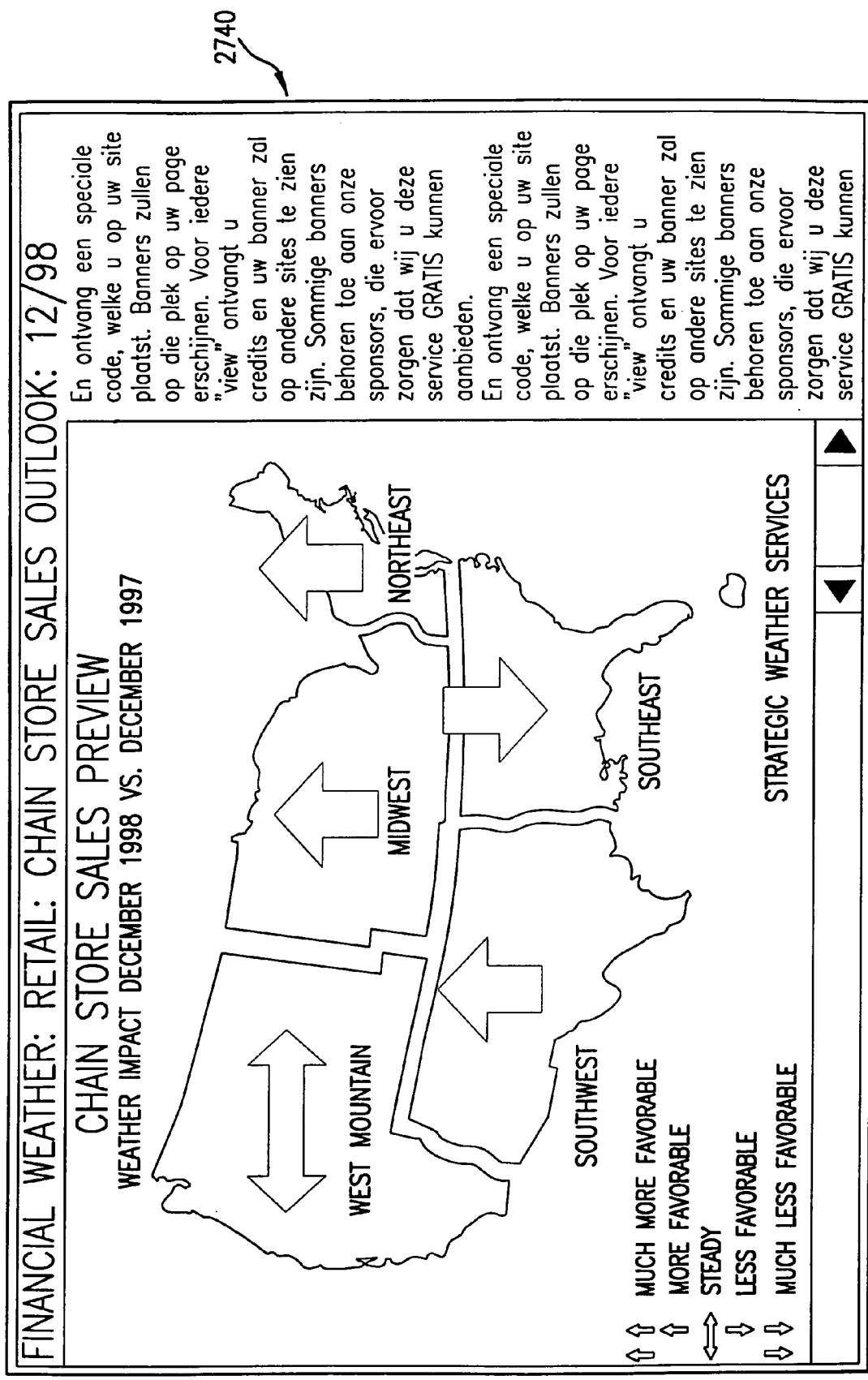
FIG. 33 is a screen shot depicting an output report format of a Finance module (of the Activities module) according to an embodiment of the present invention.

FIG. 33 is an exemplary screen shot depicting an output report 2740 format of the Finance module 2720. FIG. 33 shows report 2740 conveying information related to a chain store sales preview of weather impact in December 1998 versus December 1997.

IV. WEATHER-BASED ADVERTISEMENT

Figure 34:
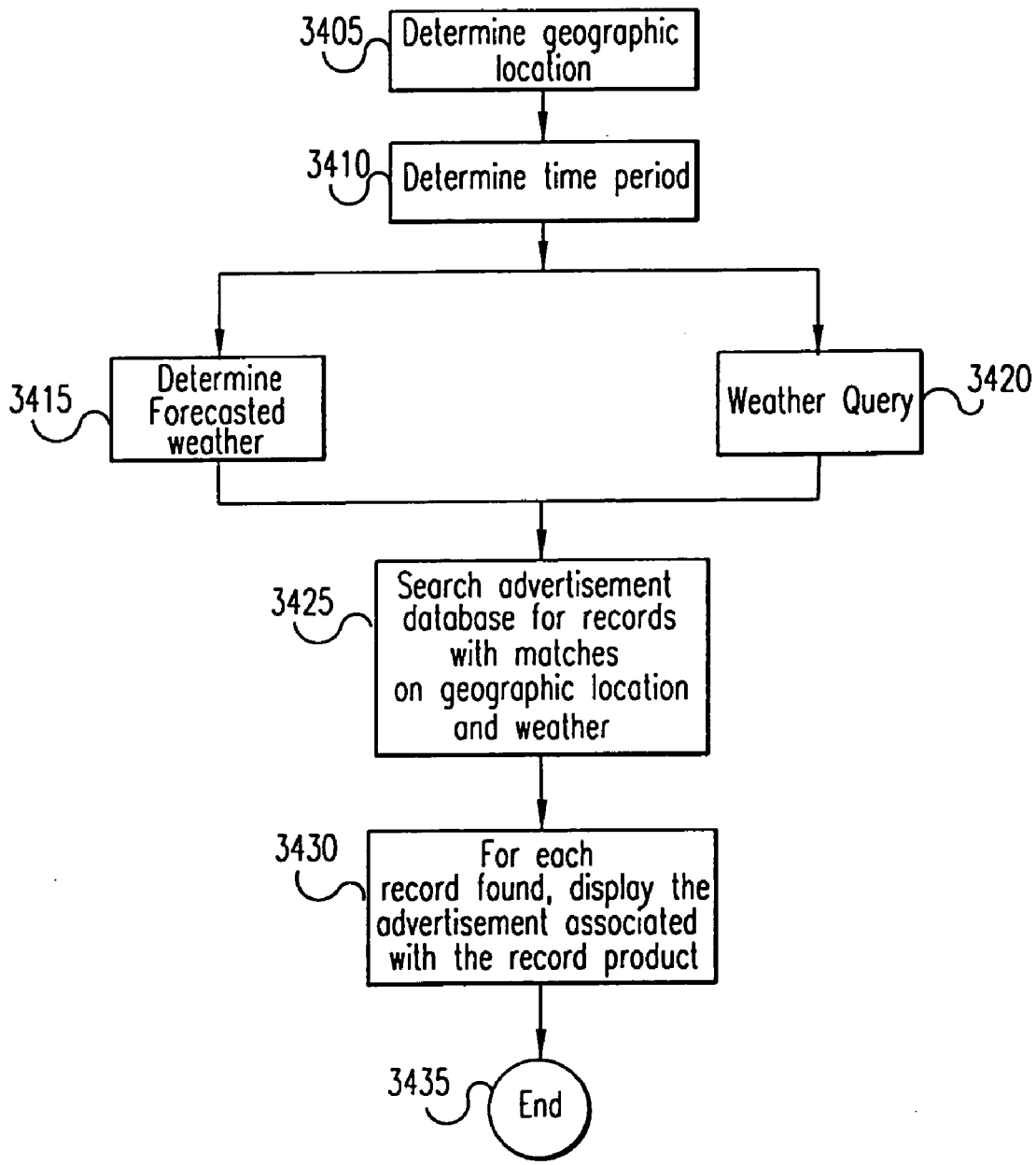
FIG. 34 is a flowchart illustrating the operation of weather-based advertisement according to an embodiment of the present invention.

Weather is one of the important variables driving consumer demand for a retailer's products. The activities planning system 105 of the present invention provides a method of automatically displaying to the user weather-based advertisements based on the user's activity while using activities planning system 105. As the user executes one of the modules described in reference to FIG. 9, activities planning system 105 utilizes both information supplied by the user (e.g., activity of interest, geographic location, time period, desired weather, etc.) and information generated by activities planning system 105 itself (e.g., forecasted weather) to determine which advertisement should be displayed to the user. Referring to FIG. 34, a flowchart illustrating the detailed operation of the weather-based advertisement is shown. In step 3405, a geographic location is determined. The geographic location is typically inputted by the user as he executes one of the modules in FIG. 9. Next, in step 3410, a time period is determined. Again, the time period is typically inputted by the user.

After determining the time period, if the activities planning system 105 has already determined the forecasted weather while executing the user's desired module (step 3415), then a weather query does not have to be performed. Alternatively, if the forecasted weather has not been determined, then a weather query is performed (step 3420). As described above, the weather query searches for the forecasted weather for the specified location and time period within weather forecast database 215. In step 3425, activities planning system 105 searches advertisement database 225 for records with matches on the geographic location and weather, and possibly other criteria, such as type of activity, and so forth. Referring again to FIG. 8, say the geographic location is MSA 100 and the forecasted weather is significant rain or snow and a temperature below 40 degrees. Activities planning system 105 would make a match with the first record shown in FIG. 8 (geographic location is MSA 100, manufacturer is Kmart, product is gloves and weather condition is significant rain or snow; temperature below 40 degrees).

After the records with matches have been determined, in step 3430, activities planning system 105 displays the advertisement associated with the product for each record. Advertisements can be text, graphics, or a combination of both. An advertisement may be associated with products in a variety of ways that is apparent to persons skilled in the relevant art(s), including through the use of pointers, or any other method of locating where the particular advertisement is stored. The flowchart in FIG. 34 ends as indicated by step 3435.

In a preferred embodiment of the present invention, the particular advertisement displayed to the user is an advertisement for a store that is located at the geographic location or destination involved in the module executed by the user. In another embodiment, the advertisement may be for a store located at the geographic location where the user is physically located at when the user is executing a module of the present invention. This helps to ensure that activities planning system 105 finds at least one match in advertisement database 225.

Alternatively, activities planning system 105 may find more than one match. Here, some scheme must exist to determine which advertisement is to be displayed. It will be apparent to one skilled in the relevant art(s) that many such schemes exist. For example, a priority scheme may be devised that will determine the order in which certain manufacturer's advertisements get displayed. Another possible scheme is to keep a count of the number of times each advertisement gets displayed to ensure each advertisement gets an equal amount of display times. Another possible scheme is to randomly pick an advertisement or display all.

V. HANDHELD WEATHER PLANNER

Figure 35:
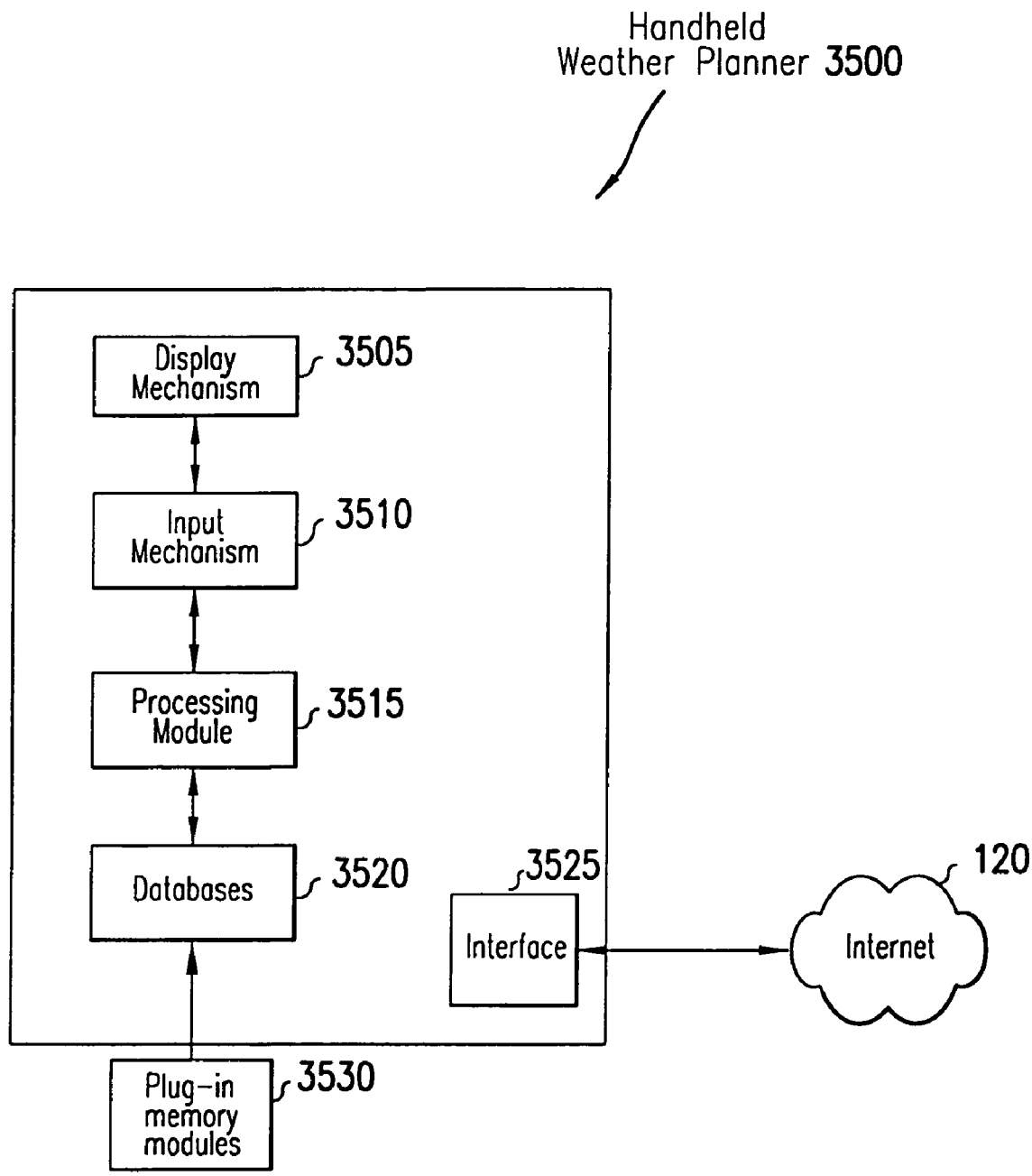
FIG. 35 is a block diagram of the physical components of handheld weather planner according to a preferred embodiment of the present invention.

The present invention provides a handheld weather planner that provides some or all of the same functionality as described above in reference to activities planning system 105. Referring to FIG. 35, a block diagram illustrates the physical components of a handheld weather planner 3500, according to a preferred embodiment of the present invention. It should be understood that the particular handheld weather planner 3500 in FIG. 35 is for illustrative purposes only and does not limit the invention. The handheld weather planner 3500 includes a display mechanism 3505, an input mechanism 3510, a processing module 3515, one or more databases 3520, an interface 3525 and optional plug-in memory modules 3530. Also shown in FIG. 35 is the Internet 120, which handheld weather planner 3500 may access via the interface 3525. In an embodiment, handheld weather planner 3500 provides the functions of the three modules described above, namely Weather-for-Event module 915, Location-for-Event module 920 and Date-for-Event module 925 for a specific geographic location. Thus, because handheld weather planner 3500 provides the functionality for a particular geographic location only, databases 3520 contain only relevant data from the weather history database 210, the weather forecast database 215, the activities database 220 and the external information source 230 for that particular geographic location. Each of the physical components of the handheld weather planner 3500 can communicate via a bus.

Connected to the databases 3520 is the processing module 3515. Processing module 3515 performs the same basic functions as planning server 205 and serves as the "backend" (i.e., weather processing system) of the present invention. Processing module 3515 utilizes both data stored in the databases 3520 and data supplied as input by the user via the input mechanism 3510. The input mechanism 3510 may be a keypad, touch pad, light pen, buttons, etc. Data entered by the input mechanism 3510 and data processed by the processing module 3515 can be displayed to the user via the display mechanism 3505. The display mechanism 3505 is preferably a LCD display (liquid crystal display) or LED display (light emitting diode), both well known in the relevant art(s).

The plug-in memory modules 3530 each contain data specific to a particular geographic location. Therefore, the plug-in memory modules 3530 of the present invention allow a single handheld weather planner 3500 to be adaptable to multiple geographic locations. As described above, handheld weather planner 3500 provides the functions of the Weather-for-Event module 915, the Location-for-Event module 920 and the Date-for-Event module 925 for a specific geographic location. The plug-in memory modules 3530 can be implemented in such a way to provide the functionality of the other modules shown in FIG. 9. For example, one plug-in memory module 3530 may provide the functionality of weather calendar module 930, another may provide the functionality of Heads-Up module 935, and so forth. In addition, plug-in memory module 3530 may contain other databases used to implement such functions as a calculator, a dictionary, and so forth. The interface 3525 provides handheld weather planner 3500 the ability to access the Internet 120.

VI. ENVIRONMENT

Figure 36:
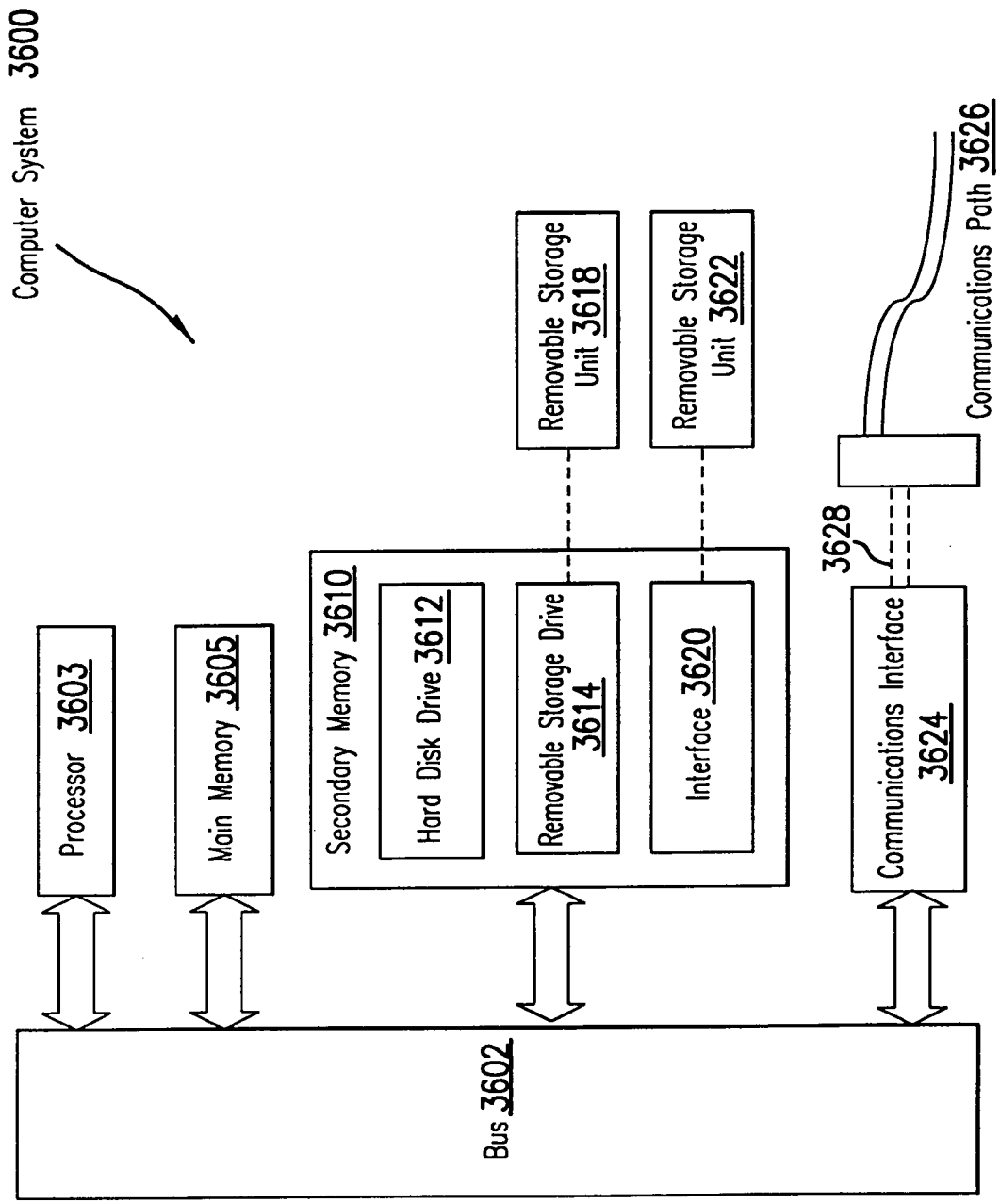
FIG. 36 is a block diagram of an exemplary computer system useful for implementing the present invention.

The present invention (i.e., activities planning system 105 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 3600 is shown in FIG. 36. The computer system 3600 includes one or more processors, such as processor 3603. The processor 3603 is connected to a communication bus 3602. Various software embodiments are described in terms of this exemplary computer system. After reading this description, it will be apparent to a person skilled in the relevant art how to implement the invention using other computer systems and/or computer architectures.

Computer system 3600 also includes a main memory 3605, preferably random access memory (RAM), and may also include a secondary memory 3610. The secondary memory 3610 may include, for example, a hard disk drive 3612 and/or a removable storage drive 3614, representing a floppy disk drive, a magnetic tape drive, an optical disk drive, etc. The removable storage drive 3614 reads from and/or writes to a removable storage unit 3618 in a well known manner. Removable storage unit 3618, represents a floppy disk, magnetic tape, optical disk, etc. which is read by and written to by removable storage drive 3614. As will be appreciated, the removable storage unit 3618 includes a computer usable storage medium having stored therein computer software and/or data.

In alternative embodiments, secondary memory 3610 may include other similar means for allowing computer programs or other instructions to be loaded into computer system 3600. Such means may include, for example, a removable storage unit 3622 and an interface 3620. Examples of such may include a program cartridge and cartridge interface (such as that found in video game devices), a removable memory chip (such as an EPROM, or PROM) and associated socket, and other removable storage units 3622 and interfaces 3620 which allow software and data to be transferred from the removable storage unit 3622 to computer system 3600.

Computer system 3600 may also include a communications interface 3624. Communications interface 3624 allows software and data to be transferred between computer system 3600 and external devices. Examples of communications interface 3624 may include a modem, a network interface (such as an Ethernet card), a communications port, a PCMCIA slot and card, etc. Software and data transferred via communications interface 3624 are in the form of signals 3628 which may be electronic, electromagnetic, optical or other signals capable of being received by communications interface 3624. These signals 3628 are provided to communications interface 3624 via a communications path (i.e., channel) 3626. This channel 3626 carries signals 3628 and may be implemented using wire or cable, fiber optics, a phone line, a cellular phone link, an RF link and other communications channels.

In this document, the term "computer program product" refers to removable storage units 3618, 3622, and signals 3628. These computer program products are means for providing software to computer system 3600. The invention is directed to such computer program products.

Computer programs (also called computer control logic) are stored in main memory 3605, and/or secondary memory 3610 and/or in computer program products. Computer programs may also be received via communications interface 3624. Such computer programs, when executed, enable the computer system 3600 to perform the features of the present invention as discussed herein. In particular, the computer programs, when executed, enable the processor 3603 to perform the features of the present invention. Accordingly, such computer programs represent controllers of the computer system 3600.

In an embodiment where the invention is implemented using software, the software may be stored in a computer program product and loaded into computer system 3600 using removable storage drive 614, hard drive 612 or communications interface 3624. The control logic (software), when executed by the processor 3603, causes the processor 3603 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. CONCLUSION

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for providing weather-based advertising, comprising the steps of: (1) receiving a user input of a geographic location; (2) receiving a user input of a time period; (3) receiving a user input of an activity; (4) determining a weather condition for said geographic location within said time period; (5) determining how said weather condition impacts said activity; (6) searching an advertisement database for a record having field that match said geographic location, said activity and said weather condition; (7) displaying information indicative of said weather condition and an advertisement associated with said record.

2. The method of claim 1, wherein step (6) comprises the steps of:
 (a) determining a priority scheme for said record; and
 (b) displaying said advertisement associated with said record according to said priority scheme.

3. The method of claim 1, wherein said weather condition include a combination of measures of at least one of a temperature and a precipitation.

4. The method of claim 3, wherein said precipitation includes snow.

5. The method of claim 3, wherein said combination of measures further includes a measure of wind.

6. The method of claim 1, wherein said user input of said geographic location, said user input of said time period and said user input of said activity are received over the Internet.

7. The method of claim 1, wherein said user input of said time period is up to one-year in the future.

8. The method of claim 1, further comprising:
 receiving said user input of said time period in one of the following formats:
  a holiday and a year for said holiday for said activity; and
  a starting date and an ending date for said activity.

9. The method of claim 1, further comprising:
 receiving a user input for a month range for said activity;
 receiving a user input for a start day of a week for said activity; and
 receiving a user input for a number of consecutive days for said activity.

10. The method of claim 1, wherein said activity is a public activity.

11. The method of claim 1, wherein said activity is a personal activity.

12. The method of claim 1, further comprising receiving from said user a preference input.

* * * * *

UNITED STATES PATENT AND TRADEMARK OFFICE
CERTIFICATE OF CORRECTION

PATENT NO. : 7,080,018 B1  Page 1 of 1
APPLICATION NO. : 09/567503
DATED : July 18, 2006
INVENTOR(S) : Fox et al.

It is certified that error appears in the above-identified patent and that said Letters Patent is hereby corrected as shown below:

Column 27
At line 23, replace "record having field that match" with --record having fields that match--.

Signed and Sealed this

Twenty-first Day of August, 2007

JON W. DUDAS
*Director of the United States Patent and Trademark Office*